(12) United States Patent
Mizobuchi et al.

(10) Patent No.: US 11,703,845 B2
(45) Date of Patent: Jul. 18, 2023

(54) ABNORMALITY PREDICTING SYSTEM AND ABNORMALITY PREDICTING METHOD

(71) Applicant: PANASONIC INTELLECTUAL PROPERTY MANAGEMENT CO., LTD., Osaka (JP)

(72) Inventors: Shohei Mizobuchi, Fukuoka (JP); Ryota Fujii, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 34 days.

(21) Appl. No.: 17/257,725

(22) PCT Filed: Jul. 4, 2019

(86) PCT No.: PCT/JP2019/026752
§ 371 (c)(1),
(2) Date: Jan. 4, 2021

(87) PCT Pub. No.: WO2020/009210
PCT Pub. Date: Sep. 1, 2020

(65) Prior Publication Data
US 2021/0255613 A1    Aug. 19, 2021

(30) Foreign Application Priority Data

Jul. 6, 2018    (JP) .................................. 2018-129168

(51) Int. Cl.
*G05B 23/02* (2006.01)
*G01H 17/00* (2006.01)

(52) U.S. Cl.
CPC ........... *G05B 23/024* (2013.01); *G01H 17/00* (2013.01); *G05B 23/0283* (2013.01)

(58) Field of Classification Search
CPC .. G05B 23/024; G05B 23/0283; G01H 17/00; G01H 3/08; G01M 99/00
See application file for complete search history.

(56) References Cited

U.S. PATENT DOCUMENTS

| 4,885,707 A | 12/1989 | Nichol et al. |
| 2010/0148942 A1* | 6/2010 | Oh .................... H04M 1/72448 340/407.1 |

(Continued)

FOREIGN PATENT DOCUMENTS

| JP | 01-216218 | 8/1989 |
| JP | 10-274558 | 10/1998 |

(Continued)

OTHER PUBLICATIONS

International Search Report (ISR) from International Searching Authority (Japan Patent Office) in International Pat. Appl. No. PCT/JP2019/026752, dated Oct. 8, 2019, together with an English language translation thereof.

(Continued)

*Primary Examiner* — Tung S Lau
(74) *Attorney, Agent, or Firm* — Greenblum & Bernstein, P.L.C.

(57) ABSTRACT

An abnormality predicting system includes a processor and a memory having instructions. The instructions, when executed by the at least one processor, cause the at least one processor to execute operations including: inputting processing target data acquired from a target device; storing information related to an abnormality prediction of the processing target data; calculating an abnormality degree of the processing target data; executing processing related to the abnormality prediction including a failure occurrence prediction using a latest abnormality degree transition and a past abnormality degree transition of the processing target data; and generating a display screen for displaying a (Continued)

processing result including an abnormality degree transition and a result of the failure occurrence prediction.

20 Claims, 28 Drawing Sheets

(56) References Cited

U.S. PATENT DOCUMENTS

| | | | | |
|---|---|---|---|---|
| 2011/0170787 | A1* | 7/2011 | Gum | H04W 76/10 |
| | | | | 715/764 |
| 2013/0211662 | A1* | 8/2013 | Blumer | G06Q 50/30 |
| | | | | 701/1 |
| 2014/0182350 | A1 | 7/2014 | Bhavaraju et al. | |
| 2014/0188402 | A1 | 7/2014 | Garcia et al. | |
| 2015/0046113 | A1 | 2/2015 | Bhavaraju et al. | |
| 2015/0046124 | A1 | 2/2015 | Bhavaraju et al. | |
| 2015/0134271 | A1* | 5/2015 | Ikejiri | G01H 1/003 |
| | | | | 702/34 |
| 2016/0041070 | A1* | 2/2016 | Wascat | G01M 7/00 |
| | | | | 702/183 |
| 2016/0058394 | A1* | 3/2016 | Koyama | A61B 5/002 |
| | | | | 340/573.1 |
| 2016/0183858 | A1 | 6/2016 | Bhavaraju et al. | |
| 2016/0302701 | A1 | 10/2016 | Bhavaraju et al. | |
| 2017/0031329 | A1* | 2/2017 | Inagaki | G06N 3/08 |
| 2017/0131783 | A1* | 5/2017 | Boshernitzan | G06F 3/017 |
| 2017/0178311 | A1* | 6/2017 | Pal | H04W 4/80 |
| 2017/0261491 | A1 | 9/2017 | Bhavaraju et al. | |
| 2017/0343451 | A1* | 11/2017 | Yoshida | G01H 1/003 |

FOREIGN PATENT DOCUMENTS

| | | |
|---|---|---|
| JP | 11-173909 | 7/1999 |
| JP | 2004-117092 | 4/2004 |
| JP | 2005-241089 | 9/2005 |
| JP | 2008-289084 | 11/2008 |
| JP | 2011-027452 | 2/2011 |
| JP | 2015-094587 | 5/2015 |
| JP | 2017-194341 | 10/2017 |

OTHER PUBLICATIONS

Written Opinion (WO) from International Searching Authority (Japan Patent Office) in International Pat. Appl. No. PCT/JP2019/026752, dated Oct. 8, 2019, together with an English language translation thereof.

Minoru Kondo at al., "Detection of abnormalities in traction diesel engines by octave band," Foreign railway locomotives and trains, Issue 6, 2016, p. 29-34, together with an English language translation.

* cited by examiner

ABNORMALITY PREDICTING SYSTEM AND ABNORMALITY PREDICTING METHOD

TECHNICAL FIELD

The present disclosure relates to an abnormality predicting system and an abnormality predicting method that acquire measurement data of a target and predict an abnormal state.

BACKGROUND ART

In various facilities and the like, a system that measures sound and vibration of a target object, a target space, or the like, analyzes acquired audio data or vibration data, and performs detection of an abnormality, monitoring of an operation state of equipment, quality determination of a product, and the like is relatedly used. As a device used for this type of analysis, for example, Patent Literature 1 discloses an abnormality determination method and a device capable of stably determining various normality and abnormality of a product having a vibration unit. In Patent Literature 1, a time axis waveform is obtained from measurement data and a time axis waveform analysis is performed to analyze the time axis waveform, and a frequency axis waveform is obtained from measurement data and a frequency axis waveform analysis is performed to analyze the frequency axis waveform, and an abnormality of a product is determined from a comprehensive determination result of the time axis waveform analysis and the frequency axis waveform analysis.

CITATION LIST

Patent Literature

Patent Literature 1: JP-A-H11-173909

SUMMARY OF INVENTION

Technical Problem

For example, in inspection and maintenance of equipment or a device of various facilities, it is assumed that the measurement data of a target device is acquired and analyzed, and abnormality determination, prediction, and the like are performed using past measurement data. In this case, for a user who performs determination and prediction of an abnormal state, there are many parts that require a wealth of specialized knowledge and know-how, such as characteristics of the measurement data, characteristics of a sensor, and tendency of the abnormal state. It may be difficult for an unskilled user to appropriately determine a processing result of the measurement data. In addition, it is also desired that a sign of a failure can be easily grasped before the abnormal state of the target device becomes remarkable and the failure occurs.

The present disclosure has been made in view of the related circumstances described above, and an object of the present disclosure is to provide an abnormality predicting system and an abnormality predicting method capable of easily performing and confirming determination and prediction of an abnormal state of a target device.

Solution to Problem

The present disclosure provides an abnormality predicting system including: a data input unit configured to input processing target data including at least one of audio data and vibration data acquired from a target device; a storage unit configured to store information related to an abnormality prediction of the processing target data; an abnormality degree calculation unit configured to calculate an abnormality degree of the processing target data; an evaluation unit configured to execute a processing related to the abnormality prediction, the processing related to the abnormality prediction including a failure occurrence prediction using a latest abnormality degree transition and a past abnormality degree transition of the processing target data; a display processing unit configured to generate a display screen for displaying a processing result including an the abnormality degree transition and a result of the failure occurrence prediction; and a display unit configured to display the display screen.

The present disclosure provides an abnormality predicting method including: inputting processing target data including at least one of audio data and vibration data acquired from a target device; storing information related to an abnormality prediction of the processing target data; calculating an abnormality degree of the processing target data; executing a processing related to the abnormality prediction, the processing related to the abnormality prediction including a failure occurrence prediction using a latest abnormality degree transition and a past abnormality degree transition of the processing target data; generating a display screen for displaying a processing result including an abnormality degree transition and a result of the failure occurrence prediction; and displaying the display screen on a display unit.

Advantageous Effects of Invention

According to the present disclosure, it is possible to easily perform and confirm determination and prediction of an abnormal state of a target device.

DESCRIPTION OF EMBODIMENTS

Hereinafter, each embodiment in which a configuration according to the present disclosure is specifically disclosed will be described in detail with reference to the drawings as appropriate. However, an unnecessarily detailed description may be omitted. For example, a detailed description of a well-known matter or a repeated description of substantially the same configuration may be omitted. This is to avoid unnecessary redundancy in a following description and to facilitate understanding of those skilled in the art. The accompanying drawings and the following description are provided for a thorough understanding of the present disclosure by those skilled in the art, and are not intended to limit a subject matter recited in the claims.

In the present embodiment, as a configuration example of a system that acquires measurement data of a target and predicts an abnormal state, an example of an abnormality predicting system and an abnormality predicting method that acquire and analyze audio data or vibration data of equipment or a device serving as a target device and perform a processing related to abnormality determination and an abnormality prediction such as a failure occurrence prediction are shown. Here, as an example of a function of the abnormality predicting system, a case is illustrated in which a cooling fan of a computer is set as the target device, audio data or vibration data of the cooling fan is set as processing target data, an abnormality prediction is performed by analyzing the processing target data, and a determination or the like is made at the time of device inspection.

First Embodiment

Figure 1:
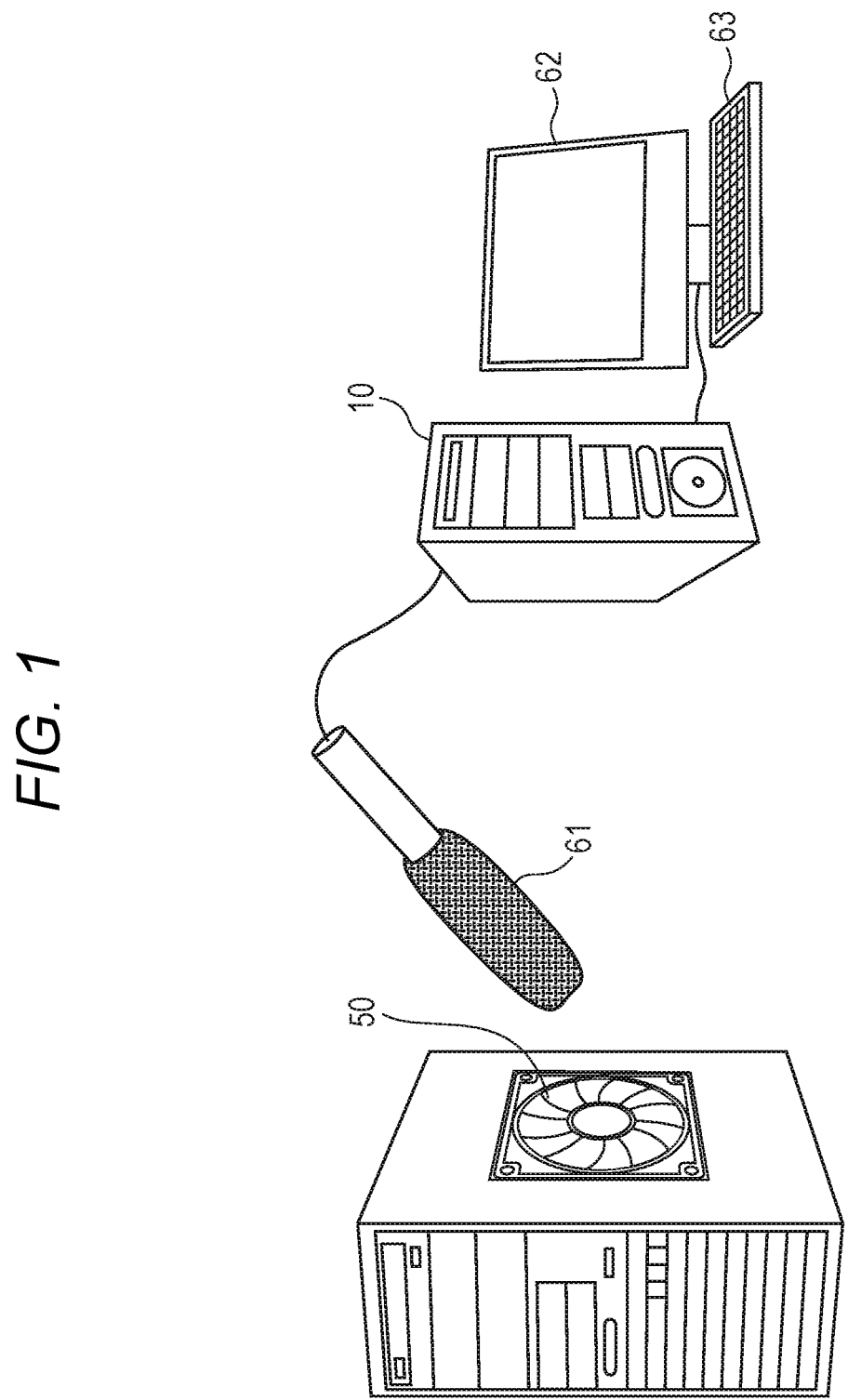
FIG. 1 is a diagram showing an example of a schematic configuration of an abnormality predicting system according to a first embodiment.

FIG. 1 is a diagram showing an example of a schematic configuration of an abnormality predicting system according to a first embodiment. The abnormality predicting system includes an information processing device (computer) having a processor and a memory, and includes a data processing device 10 that executes various processing of the audio data or the vibration data acquired as the processing target data.

A microphone 61 as an example of a data input device (sound collection unit), a monitor 62 as an example of a display device (display unit), and a keyboard 63 as an example of an operation input device are connected to the data processing device 10 as user interfaces. The data processing device 10 and the microphone 61, the monitor 62, and the keyboard 63 are connected by a wired or wireless interface. The data processing device 10 acquires audio data or vibration data generated by a cooling fan 50 of the computer as the target device for performing a processing related to the abnormality determination and the abnormality prediction such as the failure occurrence prediction, and executes analysis of the processing target data. Then, the data processing device 10 executes a processing related to the abnormality prediction by performing calculation of an abnormality degree, determination of matching of abnormality degree transitions, a prediction of failure occurrence, and the like, which will be described later, with respect to the processing target data.

The microphone 61 is configured to include, for example, a condenser microphone and the like, is disposed near the cooling fan 50 of the computer which is the target device, and inputs audio data acquired by collecting sound of the cooling fan 50 to the data processing device 10. The monitor 62 includes a display device such as a liquid crystal display or an organic electro-luminescence (EL) display, and displays a display screen of a processing result output from the data processing device 10. The keyboard 63 receives an input by a user operation, and inputs various kinds of input information such as a device event and a display content instruction to the data processing device 10. The operation input device is not limited to a keyboard, and various input devices such as a mouse, a touch pad, and a touch panel may be used.

In addition, by using a vibration sensor instead of the microphone 61 and using an input interface capable of processing an output of the vibration sensor, it is possible to configure the abnormality predicting system that analyzes acquired vibration data and performs the processing related to the abnormality determination and the abnormality prediction such as the failure occurrence prediction. In this case, the processing target data is the vibration data instead of the audio data. Since the sound is vibration of air, a similar processing can be applied. Hereinafter, a configuration example will be described in which the processing target data including the audio data or the vibration data is representatively described as the audio data and the audio data is processed.

Figure 2:
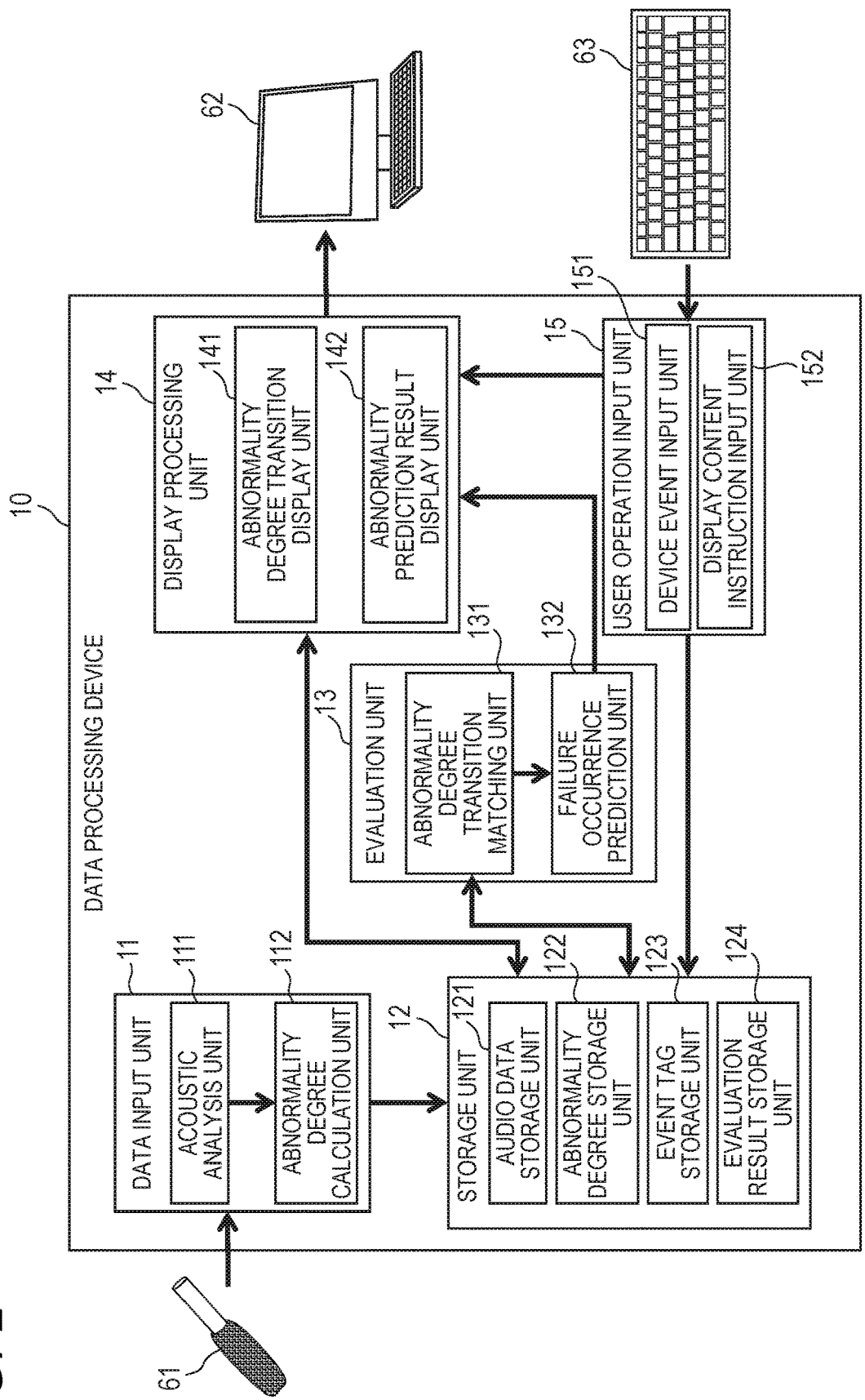
FIG. 2 is a block diagram showing an example of a functional configuration of the abnormality predicting system according to the first embodiment.

FIG. 2 is a block diagram showing an example of a functional configuration of the abnormality predicting system according to the first embodiment, and shows a functional configuration of the data processing device 10 shown in FIG. 1. Each function of the data processing device 10 is implemented by executing a processing according to a predetermined program by a computer including a processor such as a central processing unit (CPU) or a digital processor (DSP) and a memory such as a random access memory (RAM) or a read only memory (ROM). The data processing device 10 includes a data input unit 11, a storage unit 12, an evaluation unit 13, a display processing unit 14, and a user operation input unit 15.

The data input unit 11 includes an audio interface to which the microphone 61 is connected, and includes an acoustic analysis unit 111 and an abnormality degree calculation unit 112, and performs a processing by inputting the audio data as the processing target data. The acoustic analysis unit 111 executes a preprocessing of the acquired audio data such as an analog-to-digital conversion processing, a frequency conversion processing by Fast Fourier Transform (FFT), and a feature amount extraction processing by Mel-Frequency Cepstrum Coefficient (MFCC), or envelope component extraction of an amplitude value. By performing the preprocessing in the acoustic analysis unit 111, it is possible to improve accuracy of a processing result of an abnormality degree calculation processing or the like performed by the abnormality degree calculation unit 112 in a subsequent stage. The abnormality degree calculation unit 112 calculates an abnormality degree indicating a degree of an abnormal state of the audio data by a predetermined algorithm. The abnormality degree calculation unit 112 can also perform the abnormality determination as to whether the audio data is close to a failure sound based on the calculated abnormality degree. The abnormality degree calculation unit 112 can calculate an abnormality degree for each abnormality cause. For example, when the target device is a cooling fan, examples of the abnormality cause include a plurality of abnormality causes, such as blade chipping, clogging, and belt loosening of the fan. The abnormality degree calculation unit 112 can also execute a processing using a machine learning processing such as deep learning. A purpose of determining the acquired audio data is not only to detect abnormal sound at the time of a failure or at the time of a defect, but also to collect learning audio data for performing classification of sound or sound recognition.

In the acoustic analysis unit 111, one or more methods may be used for the frequency conversion processing and the feature amount extraction processing depending on characteristics of a device as a monitoring target. For example, when the target device is a cooling fan, there is a method of applying a feature amount extraction processing by linear predictive coding (LPC) and MFCC after a time-frequency transform by the Fast Fourier Transform (FFT). The LPC and the MFCC above are known as a useful method for analyzing human voice, and are used as a preprocessing for information compression and sound recognition, but it can be said to be a useful method for resonance frequency extraction and spectrum envelope extraction in device operating sound. Alternatively, it is also possible to apply Hilbert Transform directly to operating sound without performing the time-frequency transform, and use the feature amount extraction processing for obtaining an envelope component in an amplitude signal of the operating sound. In addition, when it is desired to monitor a sudden sound periodically generated in the cooling fan, a following method can be applied. In this case, for example, a start timing of the sudden sound is extracted from an amplitude value of the operating sound of the cooling fan. Then, there is a method of, by applying a wavelet transform by a mother wavelet suitable for the sudden sound, performing the time-frequency transform, and performing a feature amount extraction processing of extracting a maximum frequency peak value up to a third place for each analysis frame. However, the frequency conversion processing or the feature amount extraction processing to be used is not limited thereto.

In the abnormality degree calculation unit 112, when the abnormality degree is calculated, the abnormality degree can be calculated by using all or a part of time-frequency transformed data or feature amount extraction processed data calculated by the acoustic analysis unit 111. At this time, the abnormality degree is expressed as a one-dimensional parameter corresponding to the abnormality cause of the target device based on multi-dimensional data calculated by the acoustic analysis unit 111. In addition, a parameter indicating the abnormality degree of the entire target device may be calculated using abnormality degrees corresponding to a plurality of abnormality causes of the target device.

When the machine learning processing is used in the abnormality degree calculation unit 112, the machine learning processing may be performed using one or more statistical classification techniques. Examples of the statistical classification technique include linear classifiers, support vector machines, quadratic classifiers, kernel estimation, decision trees, artificial neural networks, Bayesian techniques and/or networks, hidden Markov models, binary classifiers, multi-class classifiers, a clustering technique, a random forest technique, a logistic regression technique, a linear regression technique, and a gradient boosting technique. However, the statistical classification technique to be used is not limited thereto.

The storage unit 12 includes a storage device including at least one of a semi-conductor memory such as a RAM and a ROM, and a storage device such as a solid state drive (SSD) and a hard disk drive (HDD). The storage unit 12 includes an audio data storage unit 121, an abnormality degree storage unit 122, an event tag storage unit 123, and an evaluation result storage unit 124. The audio data storage unit 121 stores audio data acquired by the data input unit 11. The abnormality degree storage unit 122 stores data of the abnormality degree calculated by the abnormality degree calculation unit 112. The event tag storage unit 123 stores an event tag of a device event indicating results of a failure, repair, inspection, or the like of a device input by a user. The evaluation result storage unit 124 stores evaluation results of an abnormality degree analysis and an abnormality prediction such as a failure occurrence prediction by the evaluation unit 13.

The evaluation unit 13 includes an abnormality degree transition matching unit 131 and a failure occurrence prediction unit 132. The abnormality degree transition matching unit 131 performs, as an abnormality degree analysis processing, a matching processing of comparing a current abnormality degree transition with a past abnormality degree transition about one week before a failure record related to the acquired audio data, and calculates a matching rate (matching degree) of the abnormality degree transitions. The failure occurrence prediction unit 132 predicts, as a failure occurrence prediction processing, a possibility of a failure of the target device in a near future based on a processing result of the abnormality degree transition matching unit 131, and outputs the prediction as an abnormality prediction result. Based on the abnormality prediction result, it is possible to perform the abnormality determination, the failure occurrence prediction, and the like over past, current time, and future. The matching rate of the abnormality degree transitions above and the processing result of the failure occurrence prediction are stored in the evaluation result storage unit 124 as an evaluation result of the abnormality prediction. The evaluation unit 13 can also execute a processing using the machine learning processing such as the deep learning. When the machine learning processing is used in the evaluation unit 13, the machine learning processing may be performed using one or more statistical classification techniques exemplified above.

The display processing unit 14 includes a video interface to which the monitor 62 is connected, includes an abnormality degree transition display unit 141 and an abnormality prediction result display unit 142, and performs an image processing for monitor display. The abnormality degree transition display unit 141 generates a display screen of an analysis result display in which the calculated transition of the abnormality degree is expressed by a graph display or the like. Based on a result of the abnormality degree analysis processing, when the matching rate of the abnormality degree transitions is equal to or higher than a predetermined value, the abnormality degree transition display unit 141 displays a text, an icon, an image, or the like indicating the matching rate. Based on a result of the failure occurrence prediction processing, when there is a possibility of failure occurrence in the near future, the abnormality prediction result display unit 142 generates a display screen of a prediction result display for notifying the user of a possibility of failure. A message indicating a notification of the possibility of failure is displayed by a text, an icon, an image, or the like. In addition, based on the result of the failure occurrence prediction processing, when there is a possibility of failure occurrence in the near future, the abnormality degree transition display unit 141 and the abnormality prediction result display unit 142 display the abnormality degree transition of a future prediction result. The display processing unit 14 outputs a display screen including the abnormality degree transition and the abnormality prediction result above to the monitor 62 and causes the monitor 62 to display the display screen.

The user operation input unit 15 includes an input interface to which the keyboard 63 is connected, and includes a device event input unit 151 and a display content instruction input unit 152. The device event input unit 151 receives a device event indicating results of a failure, repair, inspection, or the like of a device input by a user operation, and inputs the device event as an event tag to the event tag storage unit 123. The display content instruction input unit 152 receives a display content instruction input by a user operation, and inputs instruction information for changing display contents such as a range of a display section, a display item, and a display mode to the display processing unit 14.

Next, some examples of a display screen displayed on the monitor 62 in the abnormality predicting system according to the present embodiment are described.

Figure 3:
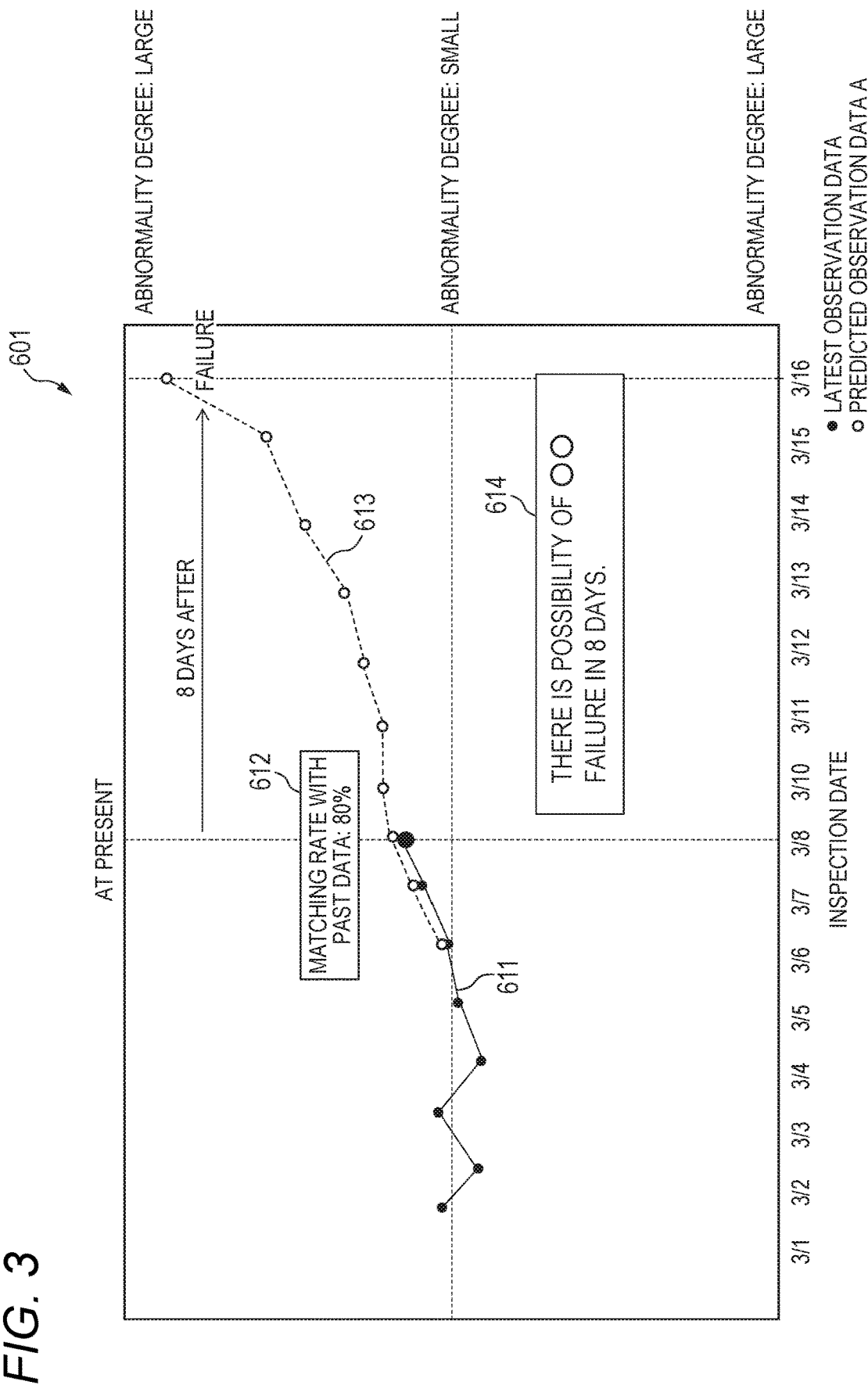
FIG. 3 is a diagram showing a first example of a monitor display screen in the abnormality predicting system according to the present embodiment.

FIG. 3 is a diagram showing a first example of a monitor display screen in the abnormality predicting system according to the present embodiment. On the monitor display screen of an illustrated example, image data for monitor display is generated by the display processing unit 14, and is output to and displayed on the monitor 62.

On a monitor display screen 601, a graph indicating the abnormality degree transition is displayed as a processing result of the evaluation unit 13. In the illustrated example, a graph of the abnormality degree transition for each inspection date is shown for the target device to be inspected every day. In a graph display, based on the result of the abnormality degree analysis processing, the data processing device 10 displays a current abnormality degree transition 611 based on latest observation data acquired at current time, and performs matching between current observation data and past observation data to calculate the matching rate of the abnormality degree transitions. Then, based on the result of the failure occurrence prediction processing, when the matching rate of the abnormality degree transitions is equal to or higher than the predetermined value, the data processing device 10 displays the abnormality degree transition of corresponding past observation data as a future prediction abnormality degree transition 613. The future prediction abnormality degree transition 613 is an abnormality degree transition having a high matching degree equal to or higher than a determination criterion based on a predetermined condition from among a large number of accumulated past record data, and corresponds to a near future prediction result with respect to the current abnormality degree transition 611. The future prediction abnormality degree transition 613 may indicate one sample of the past observation data, or may indicate a representative value of a plurality of similar samples. In addition, the data processing device 10 displays a matching rate 612 with past data related to the current abnormality degree transition together with the future prediction abnormality degree transition 613. The matching rate 612 of the abnormality degree transitions may be displayed using not only a text such as oo % but also an icon, an image, or the like.

In the first example, an abnormality degree of the observation data traced back from a current time point to past 8 days before is displayed as the current abnormality degree transition 611, and an abnormality degree from past 2 days before to 8 days after is displayed as the future prediction abnormality degree transition 613 by using a past abnormality degree transition having a high matching degree. In a display period in which the abnormality degree transition is displayed, the range of the display section can be changed according to a display content instruction by a user operation. In addition, it is also possible to change various display contents such as the display item such as the abnormality degree transition and the matching rate, and the display mode of the graph according to the display content instruction by the user operation.

The future prediction abnormality degree transition 613 indicates tendency of a transition of the abnormality degree in the near future to the user, and the user can intuitively grasp a way of the transition of the abnormality degree by the graph display. In addition, it is also possible to predict a possibility of a transition to a failure state, predict and determine the failure occurrence, and the like based on the future prediction abnormality degree transition 613. As the future prediction abnormality degree transition 613, various display methods may be used, such as when a plurality of past abnormality degree transitions having a high matching degree exist, displaying a plurality of abnormality degree transitions together, selecting and displaying the most probable abnormality degree transition according to a predetermined determination condition, or displaying an abnormality degree transition having a higher abnormality degree in order to secure a safety margin. In addition, the future prediction abnormality degree transition 613 may display an abnormality degree transition of a prediction result obtained by performing prediction on the current abnormality degree transition 611 using a predetermined algorithm or machine learning processing.

In a display example of FIG. 3, an abnormality degree transition when the abnormality degree of the future prediction abnormality degree transition 613 gradually increases and a failure occurs after 8 days is shown. Based on the result of the failure occurrence prediction processing, the data processing device 10 determines the possibility of occurrence of a failure from the future prediction abnormality degree transition 613, and displays a message 614 indicating a notification that there is a possibility of failure when the possibility of failure in the near future is equal to or higher than a predetermined value as shown in the illustrated example. The message 614 indicating that there is a possibility of failure may be displayed using not only a text including a predicted occurrence date and time such as "there is a possibility of a failure in ○ days", but also an icon, an image, or the like. In addition, as the result of the failure occurrence prediction processing, an occurrence probability of the failure may be predicted and calculated using a predetermined algorithm or machine learning processing, and a message including the occurrence probability such as "probability of occurrence of a failure within one week is ○○ %" may be displayed.

Figure 4:
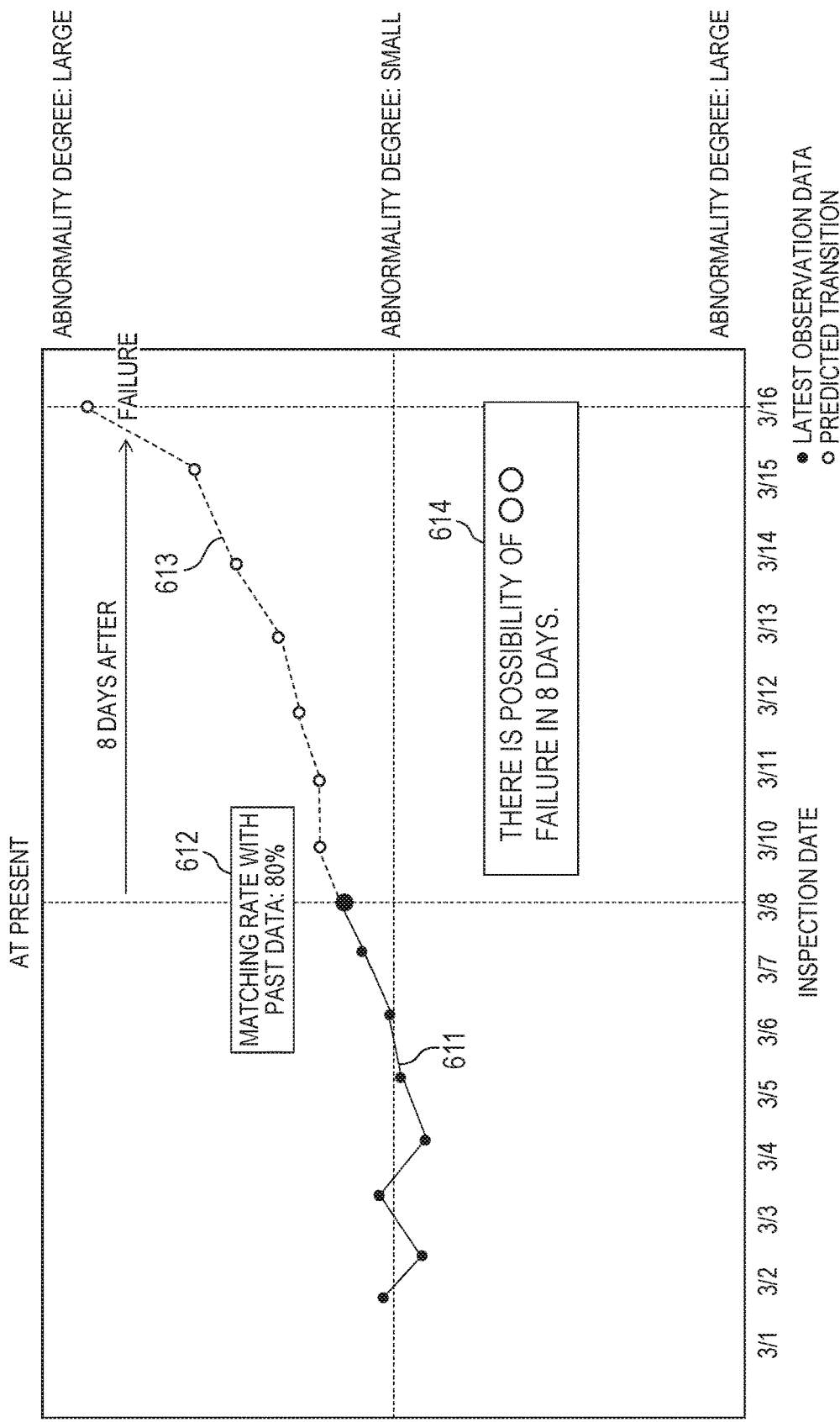
FIG. 4 is a diagram showing a second example of the monitor display screen in the abnormality predicting system according to the present embodiment.

FIG. 4 is a diagram showing a second example of the monitor display screen in the abnormality predicting system according to the present embodiment. The second example is a modification of the first example, and is an example in which the display mode of the future prediction abnormality degree transition is changed. Here, portions different from the first example will be mainly described.

On a monitor display screen 602 of the second example, similar to the first example, the current abnormality degree transition 611, the matching rate 612 of the abnormality degree transitions, the future prediction abnormality degree transition 613, and the message 614 indicating that there is a possibility of failure are displayed. In the second example, when the matching rate of the abnormality degree transitions is equal to or higher than a predetermined value, the data processing device 10 displays an abnormality degree transition from the current time point to 8 days after as the future prediction abnormality degree transition 613. That is, a value of the abnormality degree at the current time point is displayed in a state in which the current abnormality degree transition 611 and the future prediction abnormality degree transition 613 match with each other. In a display period in which the abnormality degree transition is displayed, the range of the display section can be changed according to a display content instruction by a user operation. In addition, it is also possible to change various display contents such as the display item such as the abnormality degree transition and the matching rate, and the display mode of the graph according to the display content instruction by the user operation. From such a display screen, the user can confirm the transition of the abnormality degree that continuously transitions from a current time to the near future.

Figure 5:
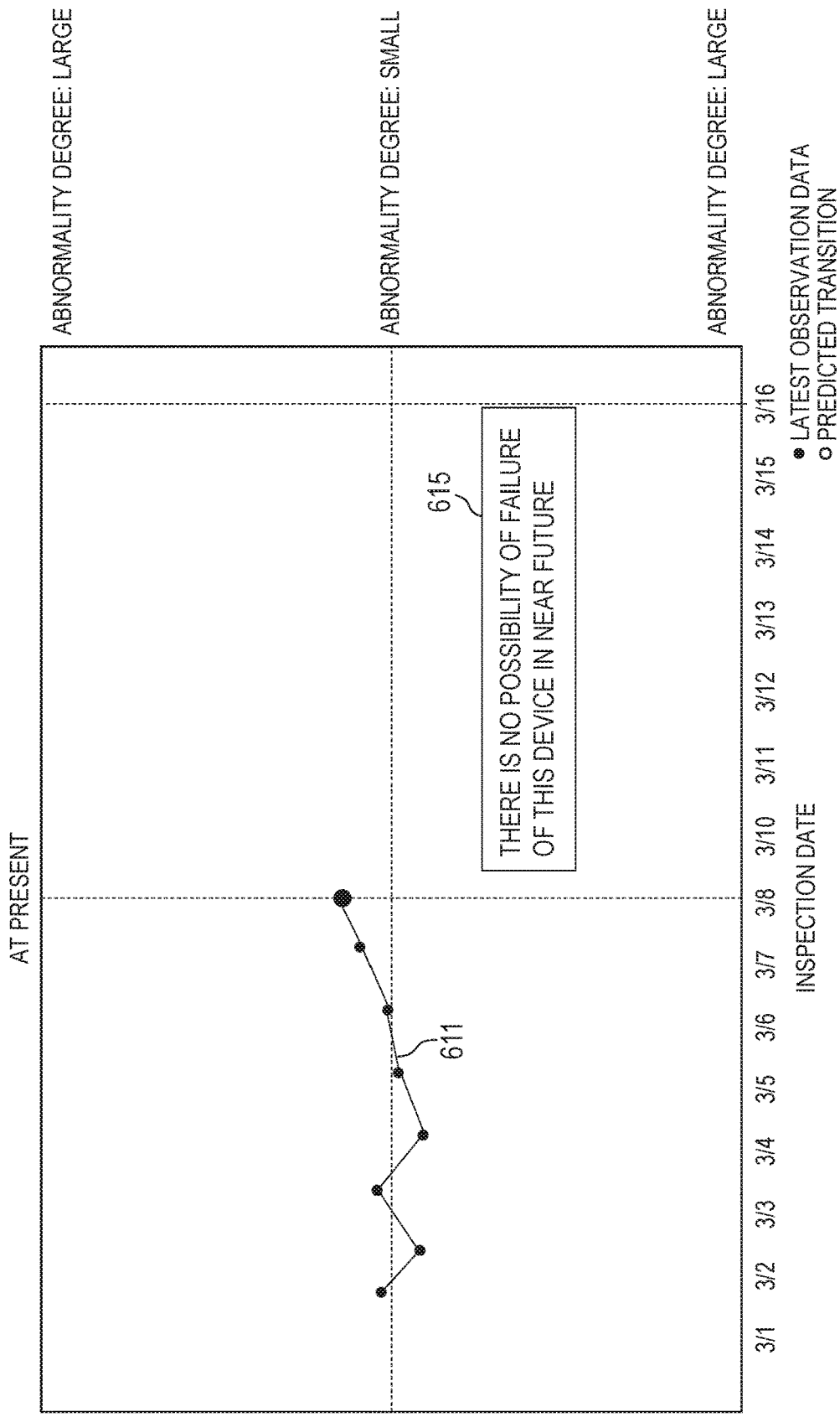
FIG. 5 is a diagram showing a third example of the monitor display screen in the abnormality predicting system according to the present embodiment.

FIG. 5 is a diagram showing a third example of the monitor display screen in the abnormality predicting system according to the present embodiment. The third example is an example in which the matching rate of the abnormality degree transitions in the first example is less than a predetermined value. Here, portions different from the first example will be mainly described.

On a monitor display screen 603 of the third example, the current abnormality degree transition 611 is displayed similar to the first example. In the third example, based on the result of the abnormality degree analysis processing, when the matching rate of the abnormality degree transitions is less than the predetermined value and there is no abnormality degree transition that matches with the abnormality degree transition of the past observation data, the data processing device 10 does not display and hides the future prediction abnormality degree transition 613. Based on the result of the failure occurrence prediction processing, when the possibility of occurrence of a failure in the near future is less than a predetermined value and the possibility of failure is small, the data processing device 10 may hide the future prediction abnormality degree transition 613 and display only the current abnormality degree transition 611. At this time, the data processing device 10 displays a message 615 indicating a notification that there is no possibility of failure. The message 615 indicating that there is no possibility of failure may be displayed using not only a text such as "there is no possibility of failure" but also an icon, an image, or the like. In addition, as the result of the failure occurrence prediction processing, an occurrence probability of the failure may be predicted and calculated using a predetermined algorithm or machine learning processing, and a message including the occurrence probability may be displayed. In a display period in which the abnormality degree transition is displayed, the range of the display section can be changed according to the display content instruction by the user operation. In addition, it is also possible to change various display contents such as the display item such as the abnormality degree transition, and the display mode of the graph by the display content instruction by the user operation.

Figure 6:
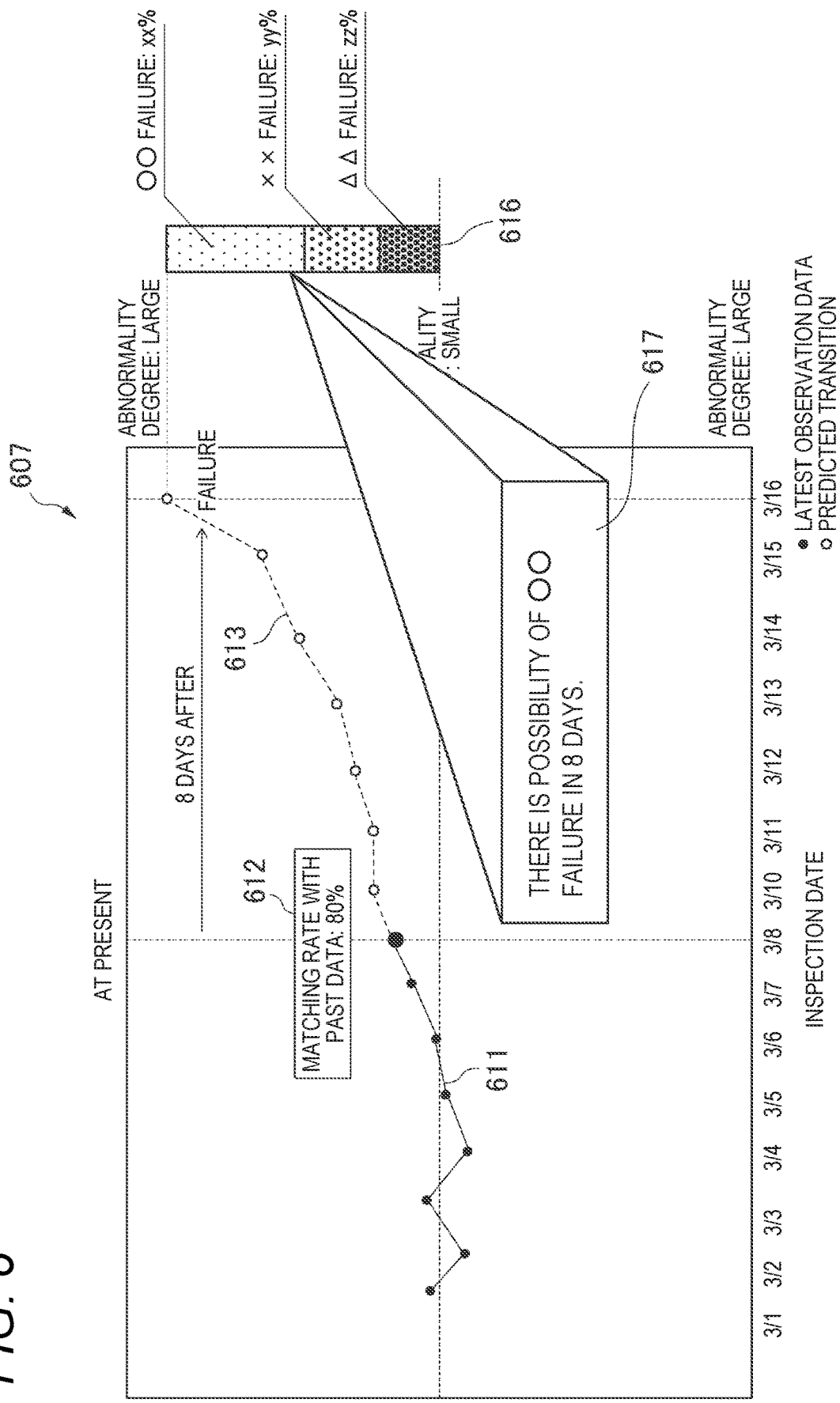
FIG. 6 is a diagram showing a fourth example of the monitor display screen in the abnormality predicting system according to the present embodiment.

FIG. 6 is a diagram showing a fourth example of the monitor display screen in the abnormality predicting system according to the present embodiment. The fourth example is an example in which an abnormality degree of a future prediction for each abnormality cause is displayed.

On a monitor display screen 607 of the fourth example, similar to the first example, the current abnormality degree transition 611, the matching rate 612 of the abnormality degree transitions, and the future prediction abnormality degree transition 613 are displayed, and an abnormality degree ratio 616 for each abnormality cause and a message 617 indicating that there is a possibility of failure are displayed. In the fourth example, the data processing device 10 calculates an abnormality degree by classifying one piece of acquired audio data according to each abnormality cause from information included in the audio data, and executes the abnormality determination and the failure occurrence prediction for each abnormality cause over the past, the current time, and the future in the evaluation unit 13. The abnormality degree for each abnormality cause can be calculated based on transition of characteristics of the audio data. For example, when the target device is a cooling fan, examples of the abnormality cause include a plurality of abnormality causes, such as blade chipping, clogging, and belt loosening of the fan.

The data processing device 10 displays the abnormality degree ratio 616 for each abnormality cause on a bar graph or the like based on results of the abnormality degree analysis processing and the failure occurrence prediction processing by the display processing unit 14. The abnormality degree ratio 616 for each abnormality cause includes, for example, a ratio display of each abnormality cause with respect to the audio data, such as "∘∘ failure: xx %, xx failure: yy %, ΔΔ failure: zz %". As in an illustrated example, the abnormality degree ratio 616 for each abnormality cause is preferable with good visibility when results for each abnormality cause for one target device are summarized and displayed in one graph. Based on the result of the failure occurrence prediction processing, the data processing device 10 displays the message 617 indicating that there is a possibility of failure related to the corresponding abnormality cause when there is a possibility of failure equal to or higher than a predetermined value in the near future. Accordingly, it is possible to estimate an abnormality occurring for each cause or each phenomenon, for example, what kind of cause causes the possibility of failure, instead of abnormality estimation of a constituent unit such as a component, a member, or a unit in the target device. By performing abnormality estimation for each abnormality cause and displaying the abnormality estimation on the display screen, it is possible for the user to take appropriate measures in accordance with the abnormality cause, such as only maintenance, repair or replacement depending on the cause.

Figure 7:
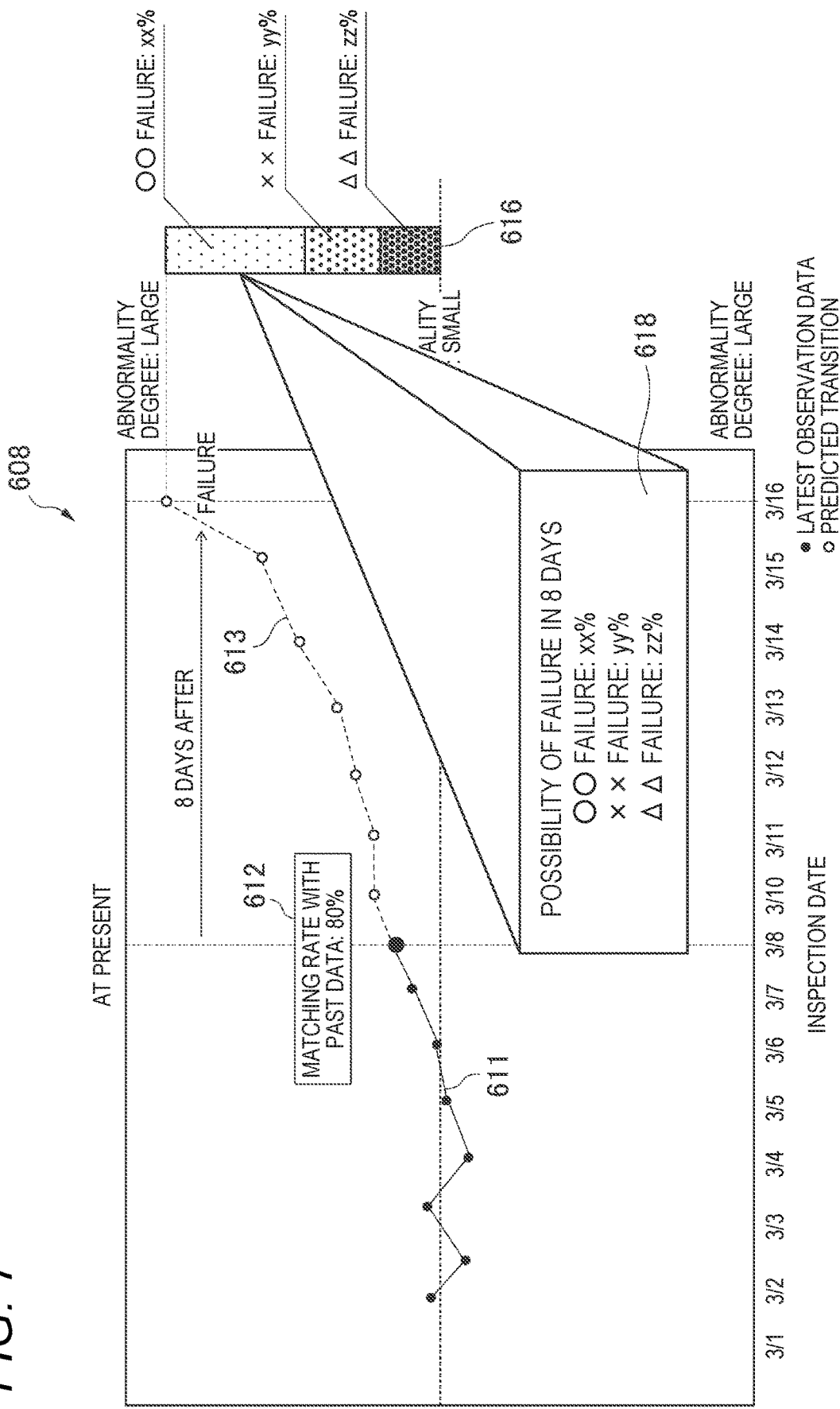
FIG. 7 is a diagram showing a fifth example of the monitor display screen in the abnormality predicting system according to the present embodiment.

FIG. 7 is a diagram showing a fifth example of the monitor display screen in the abnormality predicting system according to the present embodiment. The fifth example is a modification of the fourth example, and is an example in which the display mode of the message indicating that there is a possibility of failure is changed. Here, portions different from the first example will be mainly described.

On a monitor display screen 608 of the fifth example, similar to the fourth example, the current abnormality degree transition 611, the matching rate 612 of the abnormality degree transitions, the future prediction abnormality degree transition 613 are displayed, the abnormality degree ratio 616 for each abnormality cause and a message 618 indicating that there is a possibility of failure are displayed. In the fifth example, the data processing device 10 displays a ratio of the possibility of occurrence of a failure for each abnormality cause as the message 618 indicating that there is a possibility of failure based on a calculated abnormality degree ratio for each abnormality cause. The message 618 indicating that there is a possibility of failure includes, for example, a ratio display of a possibility of occurrence of a failure due to each abnormality cause with respect to the audio data, such as "∘∘ failure: xx %, xx failure: yy %, ΔΔ failure: zz %". From such a display screen, the user can confirm a ratio of the abnormality degree for each abnormality cause and the possibility of failure for each abnormality cause.

Next, an example of a processing procedure related to the abnormality predicting method in the abnormality predicting system according to the present embodiment will be described.

Figure 8:
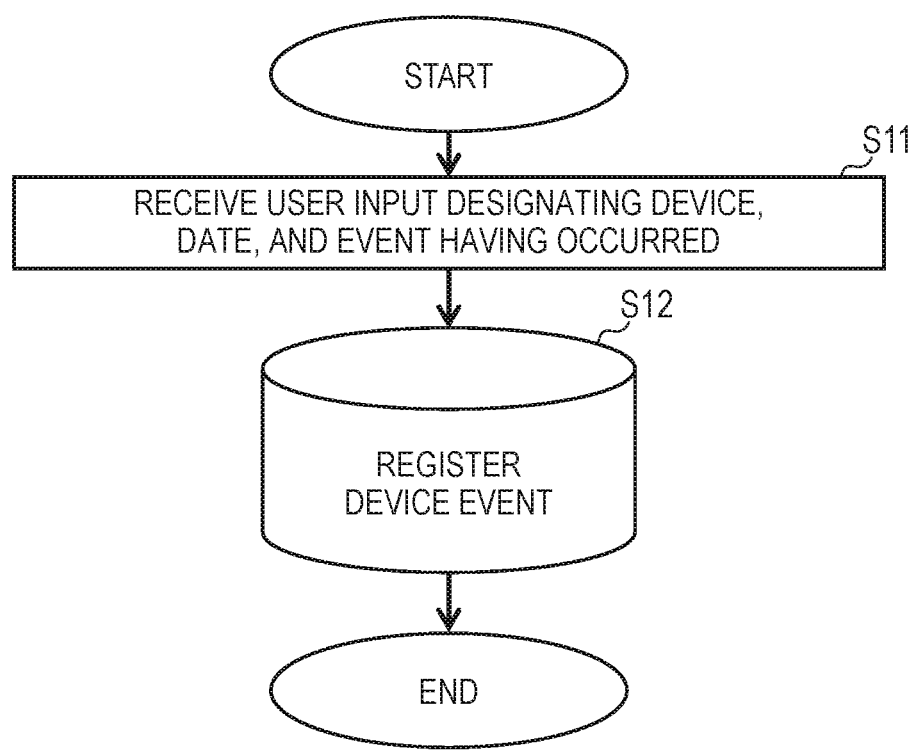
FIG. 8 is a flowchart showing an example of a procedure of an event input processing according to the present embodiment.

FIG. 8 is a flowchart showing an example of a procedure of an event input processing according to the present embodiment. In the abnormality predicting system, at the time of inspection or repair of the target device, the user inputs a device event indicating results of a failure, repair, inspection, or the like of a device, and records a history of events that occurred in the past. The data processing device 10 executes the event input processing corresponding to a device event input by the user in the user operation input unit 15.

The data processing device 10 receives a device event indicating results of a failure, repair, inspection, or the like of the device input from the keyboard 63 or the like by a user operation in the device event input unit 151 of the user operation input unit 15 (S11). The device event includes device identification information based on a device name, a model number, a serial number, and the like of the target device, time information such as a date and time, event type information such as a name of an occurred event, and the like. Then, the data processing device 10 stores and registers device event information in the event tag storage unit 123 of the storage unit 12 as an event tag (S12). Event tag information indicating the device event can be used for determining presence or absence of the possibility of failure based on the abnormality degree transition in the failure occurrence prediction processing of the evaluation unit 13. For example, prediction accuracy can be improved by using a past inspection result, a past repair result, or the like as a parameter of the failure occurrence prediction.

Figure 9:
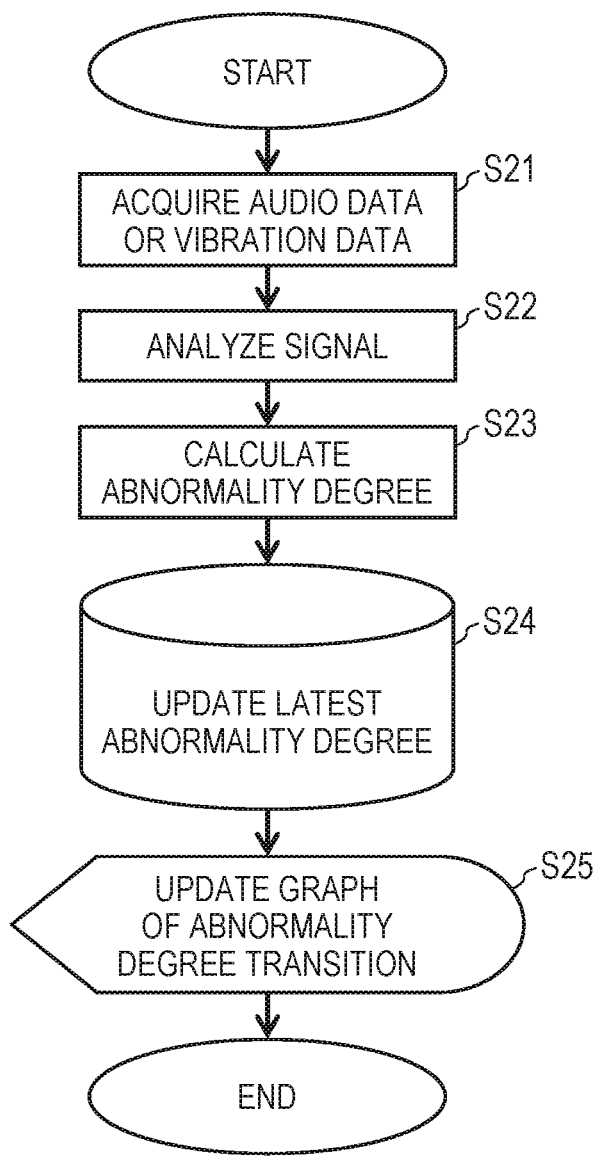
FIG. 9 is a flowchart showing an example of a procedure of an abnormality degree calculation processing according to the present embodiment.

FIG. 9 is a flowchart showing an example of a procedure of the abnormality degree calculation processing according to the present embodiment. The data processing device 10 executes an abnormality degree calculation processing related to the audio data of the target device input from the microphone 61 in the data input unit 11.

The data processing device 10 acquires audio data (or vibration data) of the cooling fan 50 collected by the microphone 61 (S21), and performs a preprocessing such as a frequency conversion processing to analyze a signal of the audio data in the acoustic analysis unit 111 of the data input unit 11 (S22). Accordingly, a characteristic element such as a frequency characteristic of the audio data is acquired. At this time, the data processing device 10 stores the acquired audio data in the audio data storage unit 121 of the storage unit 12. Then, the abnormality degree calculation unit 112 of the data input unit 11 calculates an abnormality degree of the acquired audio data (S23).

Here, an example of an abnormality degree calculation method will be described. An abnormality degree A can be calculated based on a sum of distances between current measurement data and past measurement results of the target for each frequency, using frequency characteristics of the audio data of an acoustic analysis result, and is obtained by, for example, a sum of amounts exceeding a maximum value or a minimum value of a sound pressure for each frequency. That is, the abnormality degree A is calculated by a sum of distances between a measured value and the maximum value or the minimum value when the sound pressure for each frequency exceeds the maximum value or the minimum value. The abnormality degree A can be expressed by a mathematical formula as shown in the following Formula (1).

$$A = \Sigma(1/n)di \quad (1)$$

where $\Sigma$ is i=0 to n−1, and (1/n) di is added in a range of 1024 steps (n=1024) from 0 Hz to 24 kHz in an acoustic frequency band.

When a sound pressure value of a certain frequency is represented by $xi$, $di=|Smax-xi|$ in a case of $Smax<xi$, $di=|Smin-xi|$ in a case of $Smin>xi$, and $di=0$ in a case of $Smin \leq xi \leq Smax$.

Using Formula (1), when the sound pressure value xi exceeds the maximum value or the minimum value at any frequency of 0 Hz to 24 kHz, the distance di between the sound pressure value xi and the maximum value or the minimum value is calculated, and the distance di is added at all frequencies of 0 Hz to 24 kHz to obtain the sum, thereby calculating the abnormality degree A. The abnormality degree A may be calculated using a predetermined coefficient according to a frequency characteristic of a processing target, a surrounding environment, a sound collection condition, and the like, such as performing a predetermined weighting according to the frequency.

Next, the data processing device 10 stores data of the abnormality degree calculated by the abnormality degree calculation unit 112 in the abnormality degree storage unit 122 of the storage unit 12, and updates a value of a latest abnormality degree (S24). In addition, the data processing device 10 generates an image of the abnormality degree transition using the updated latest abnormality degree, and updates the graph of the abnormality degree transition of the monitor display screen in the abnormality degree transition display unit 141 of the display processing unit 14 (S25). Accordingly, the graph display indicating the current abnormality degree transition is updated on the monitor display screen displayed on the monitor 62.

Figure 10:
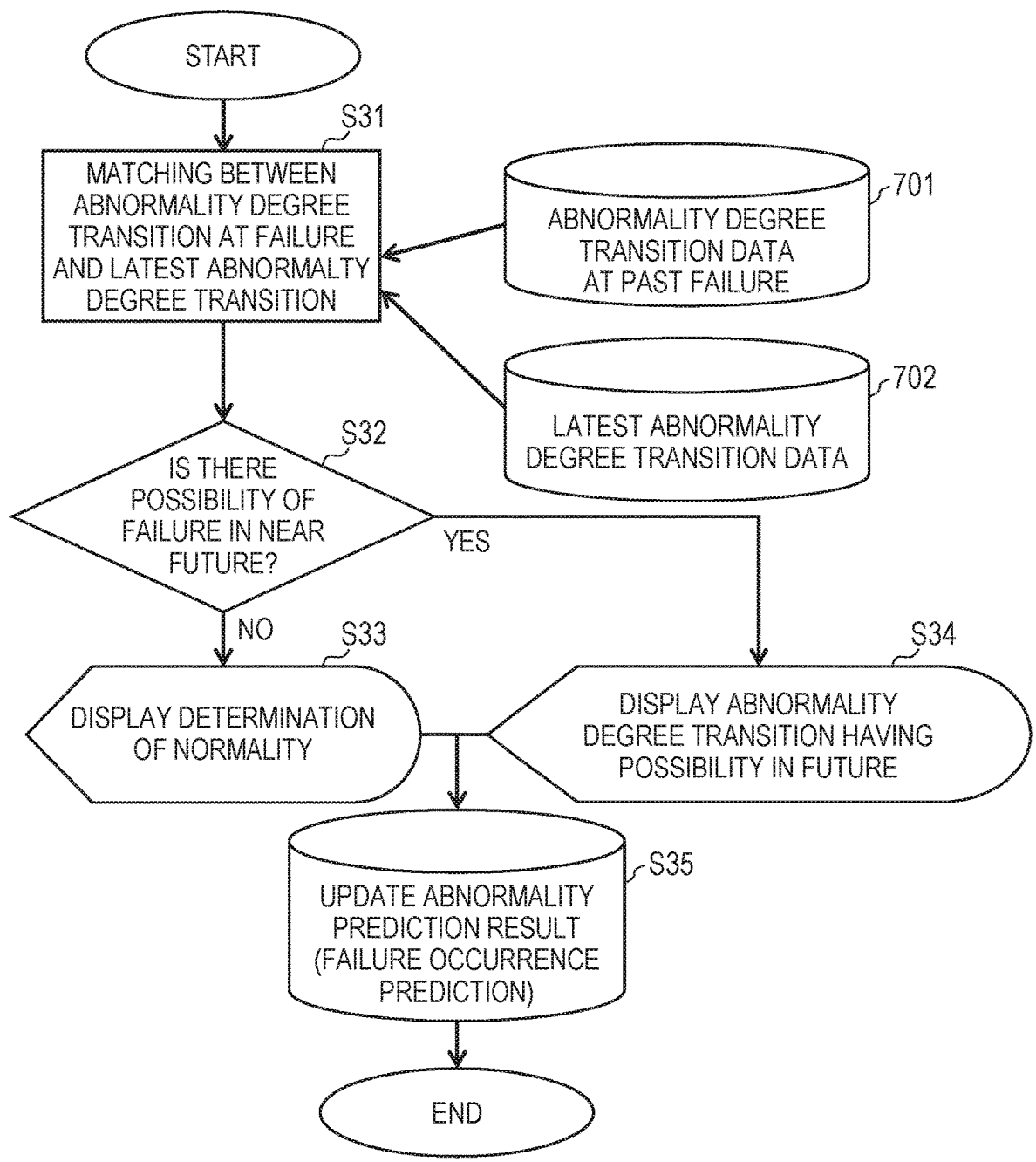
FIG. 10 is a flowchart showing an example of a procedure of an abnormality evaluation processing according to the present embodiment.

FIG. 10 is a flowchart showing an example of a procedure of an abnormality evaluation processing according to the present embodiment. The data processing device 10 executes the abnormality evaluation processing based on an abnormality degree transition of observation data of the target device in the evaluation unit 13.

The data processing device 10 refers to latest abnormality degree transition data 702 and abnormality degree transition data at the time of past failure 701 stored in the abnormality degree storage unit 122, and performs a matching processing between an abnormality degree transition at the time of the past failure and a latest abnormality degree transition in the abnormality degree transition matching unit 131 of the evaluation unit 13 (S31). Then, the failure occurrence prediction unit 132 of the evaluation unit 13 determines whether there is a possibility of a failure of the target device in the near future based on the abnormality degree transition at the time of the past failure having a high matching degree based on a result of the matching processing, and outputs the result as an abnormality prediction result (S32). As a method of calculating the matching rate, for example, a method of comparing the past abnormality degree transition and the latest abnormality degree transition for each sample (for example, an abnormality degree value for each inspection date), calculating a ratio of a matching number of samples whose difference is less than a predetermined value, and showing the rate as a percentage may be used. In addition, the matching rate may be calculated using a predetermined coefficient such as Cohen's match coefficient or an evaluation formula.

Here, when the possibility of failure in the near future is low, a monitor display screen for displaying determination of normality is generated in the abnormality degree transition display unit 141 and the abnormality prediction result display unit 142 of the display processing unit 14, and is displayed on the monitor 62 (S33). In this case, for example, the monitor display screen of the third example shown in FIG. 5 is displayed. In addition, when there is a possibility of failure in the near future, a monitor display screen for displaying an abnormality degree transition having a possibility in the future is generated in the abnormality degree transition display unit 141 and the abnormality prediction result display unit 142 of the display processing unit 14, and is displayed on the monitor 62 (S34). In this case, for example, the monitor display screen of the first example shown in FIG. 3 or the second example shown in FIG. 4 is displayed. Accordingly, on the monitor display screen displayed on the monitor 62, a graph display indicating the current abnormality degree transition and a message display indicating an abnormality prediction result such as a failure occurrence possibility are displayed.

In addition, the data processing device 10 stores abnormality prediction data including the abnormality prediction result such as the failure occurrence possibility by the failure occurrence prediction unit 132 in the evaluation result storage unit 124 of the storage unit 12, and updates the abnormality prediction result (failure occurrence prediction) (S35).

Figure 11:
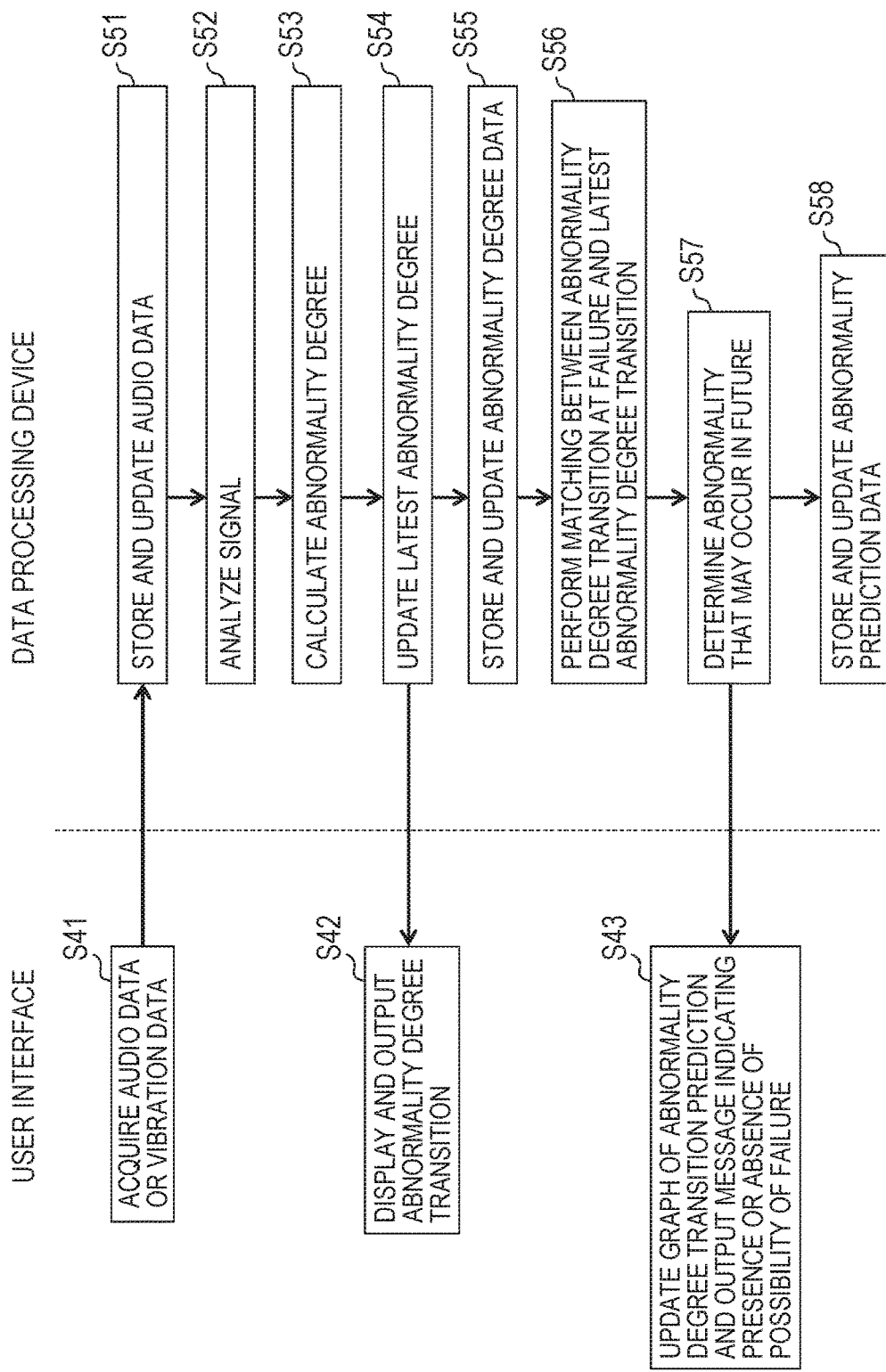
FIG. 11 is a sequence diagram showing an operation of the abnormality predicting system according to the first embodiment.

FIG. 11 is a sequence diagram showing an operation of the abnormality predicting system according to the first embodiment. FIG. 11 shows a flow of a processing performed by the microphone 61 and the monitor 62 as the user interfaces, and the data processing device 10 in the abnormality predicting system according to the first embodiment.

The audio data (or vibration data) of the cooling fan 50, which is the target device, is collected and acquired by the microphone 61 (S41), and the data processing device 10 inputs the acquired audio data, stores the audio data in the audio data storage unit 121, and updates the audio data (S51). Then, the data processing device 10 analyzes a signal of the audio data (S52) and calculates the abnormality degree (S53). Next, the data processing device 10 updates a value of the latest abnormality degree according to the calculated abnormality degree (S54), displays and outputs a graph of the abnormality degree transition on the monitor 62 (S42), stores data of the calculated abnormality degree in the abnormality degree storage unit 122, and updates abnormality degree data (S55). Accordingly, a graph display or the like of the abnormality degree transition up to the current time is displayed on the monitor 62.

Next, the data processing device 10 performs a matching processing between the abnormality degree transition at the time of the past failure and the latest abnormality degree transition (S56), and based on a result of the matching processing, determines whether there is an abnormality that may occur in the target device in the near future, and determines the possibility of failure (S57). In addition, the data processing device 10 updates the graph of the abnormality degree transition prediction to be output to the monitor 62, and outputs a message display indicating the presence or absence of the possibility of failure (S43). Accordingly, on a display screen of the monitor 62, a graph display of the graph of the abnormality degree transition prediction is updated, and a message display indicating the presence or absence of the possibility of failure is displayed. Then, the data processing device 10 stores the abnormality prediction data including the abnormality prediction result such as the failure occurrence possibility in the evaluation result storage unit 124, and updates the abnormality prediction data (S58).

As described above, in the present embodiment, the processing target data of the audio data or the vibration data of the target device is acquired, the abnormality degree is calculated, and the abnormality degree data is stored and accumulated. Then, a matching processing of the past abnormality degree transition is performed with respect to a latest abnormality degree transition of current processing target data to extract an abnormality degree transition having a high matching degree having the matching rate equal to or higher than a predetermined value, and to determine whether there is a possibility of failure in the near future due to the abnormality degree transition having the high matching degree. In addition, as a processing result, the latest abnormality degree transition is displayed, and when there is an abnormality degree transition with a high matching degree, this is displayed as the abnormality degree transition of the future prediction, and a prediction result indicating the possibility of failure is displayed. Accordingly, the user can easily visually check and grasp the current abnormality degree transition and the abnormality degree transition predicted in the future without requiring specialized knowledge and know-how related to the target device, a sensor, and a measurement result, and can easily perform the determination and prediction of the abnormal state. In addition, since a prediction result of the abnormality degree transition in the near future and the prediction result of the possibility of failure can be provided to the user, the user can confirm a trend of the abnormality degree and easily grasp a sign of the failure before the failure occurs in the target device. Therefore, it is possible to perform advanced maintenance on the target device.

Second Embodiment

Figure 12:
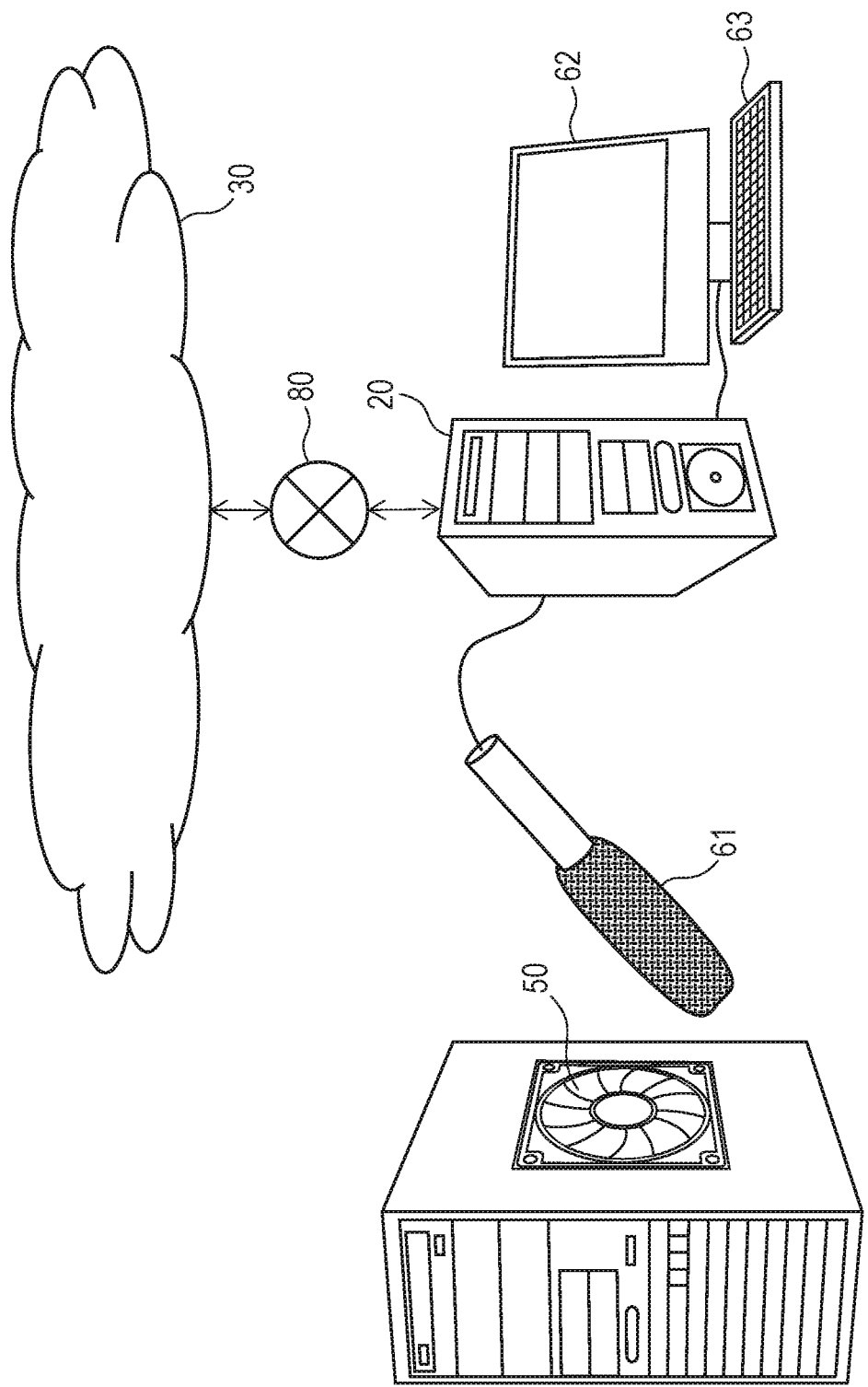
FIG. 12 is a diagram showing an example of a schematic configuration of an abnormality predicting system according to a second embodiment.

FIG. 12 is a diagram showing an example of a schematic configuration of an abnormality predicting system according to a second embodiment. The abnormality predicting system according to the second embodiment is a configuration example in which a processing by a data processing device is distributed between and executed in a terminal device 20 at hand and a cloud computer 30 on a network.

The terminal device 20 is a local computer configured by an information processing device including a processor and a memory, and is connected to the microphone 61, the monitor 62, and the keyboard 63 as the user interfaces. As the terminal device 20, various information processing devices such as a desktop or notebook personal computer (PC), a tablet terminal, and a smartphone can be used. The cloud computer 30 is connected to the terminal device 20 via a communication path 80 such as a wired or wireless network or a communication line, and is configured as a remote information processing device (remote computer) including a server device provided on the network. An overall function of the abnormality predicting system is similar to that of the first embodiment shown in FIG. 1. Here, parts different from the first embodiment will be mainly described.

Figure 13:
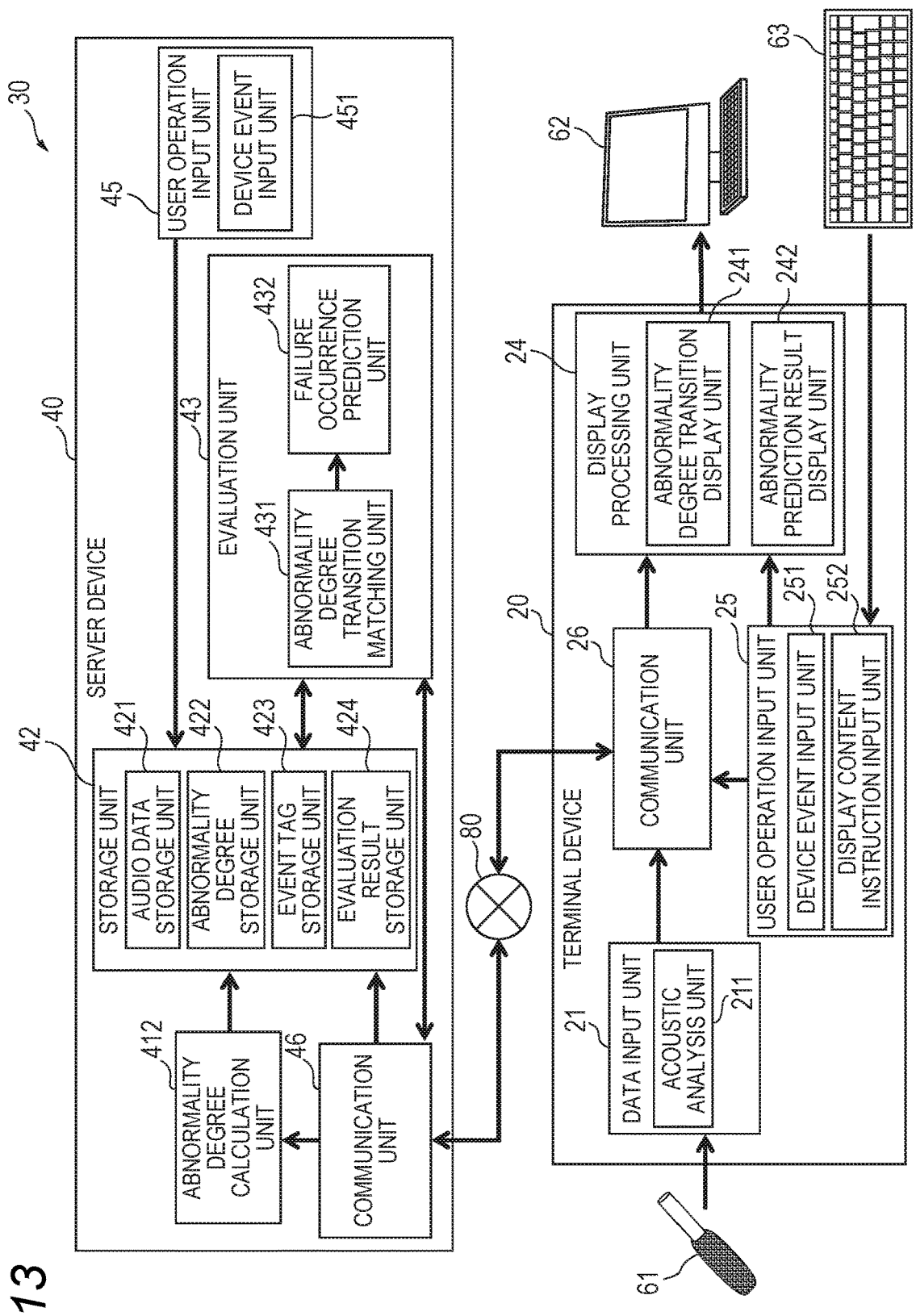
FIG. 13 is a block diagram showing an example of a functional configuration of the abnormality predicting system according to the second embodiment.

FIG. 13 is a block diagram showing an example of a functional configuration of the abnormality predicting system according to the second embodiment, and shows a functional configuration of the terminal device 20 and a server device 40 of the cloud computer 30 shown in FIG. 12. Each function of the terminal device 20 and the server device 40 is implemented by executing a processing according to a predetermined program by a computer including a processor such as a CPU and a DSP and a memory such as a RAM and a ROM.

The terminal device 20 is configured by an information processing device having a processor and a memory, and the terminal device 20 includes a data input unit 21, a display processing unit 24, a user operation input unit 25, and a communication unit 26. The data input unit 21 includes an acoustic analysis unit 211 similar to the acoustic analysis unit 111 of the first embodiment. The server device 40 may have a function of the acoustic analysis unit 211. The display processing unit 24 includes an abnormality degree transition display unit 241 and an abnormality prediction result display unit 242 similar to the abnormality degree transition display unit 141 and the abnormality prediction result display unit 142 of the first embodiment. The user operation input unit 25 includes a device event input unit 251 and a display content instruction input unit 252 similar to the device event input unit 151 and the display content instruction input unit 152 of the first embodiment. The communication unit 26 has a wired or wireless communication interface, and communicates with the server device 40 via the communication path 80.

The server device 40 is configured by an information processing device having a processor and a memory, and the server device 40 includes an abnormality degree calculation unit 412, a storage unit 42, an evaluation unit 43, a user operation input unit 45, and a communication unit 46. The abnormality degree calculation unit 412 has a similar function as that of the abnormality degree calculation unit 112 according to the first embodiment. The storage unit 42 includes an audio data storage unit 421, an abnormality degree storage unit 422, an event tag storage unit 423, and an evaluation result storage unit 424 similar to the audio data storage unit 121, the abnormality degree storage unit 122, the event tag storage unit 123, and the evaluation result storage unit 124 of the first embodiment. The evaluation unit 43 includes an abnormality degree transition matching unit 431 and a failure occurrence prediction unit 432 similar to the abnormality degree transition matching unit 131 and the failure occurrence prediction unit 132 of the first embodiment. The user operation input unit 45 includes a device event input unit 451 similar to the device event input unit 151 of the first embodiment, and the server device 40 can also perform a device event input processing. The communication unit 46 communicates with the terminal device 20 via the communication path 80, and transmits and receives audio data, audio data after an analysis processing, abnormality degree data, an event tag, evaluation result data of an abnormality prediction, and the like to and from the terminal device 20.

In the second embodiment, the terminal device 20 acquires audio data of a target device, displays processing results of an abnormality degree transition, a failure occurrence prediction, and the like, and the server device 40 executes a processing with a relatively large processing load such as calculation of an abnormality degree and a failure occurrence prediction.

Figure 14:
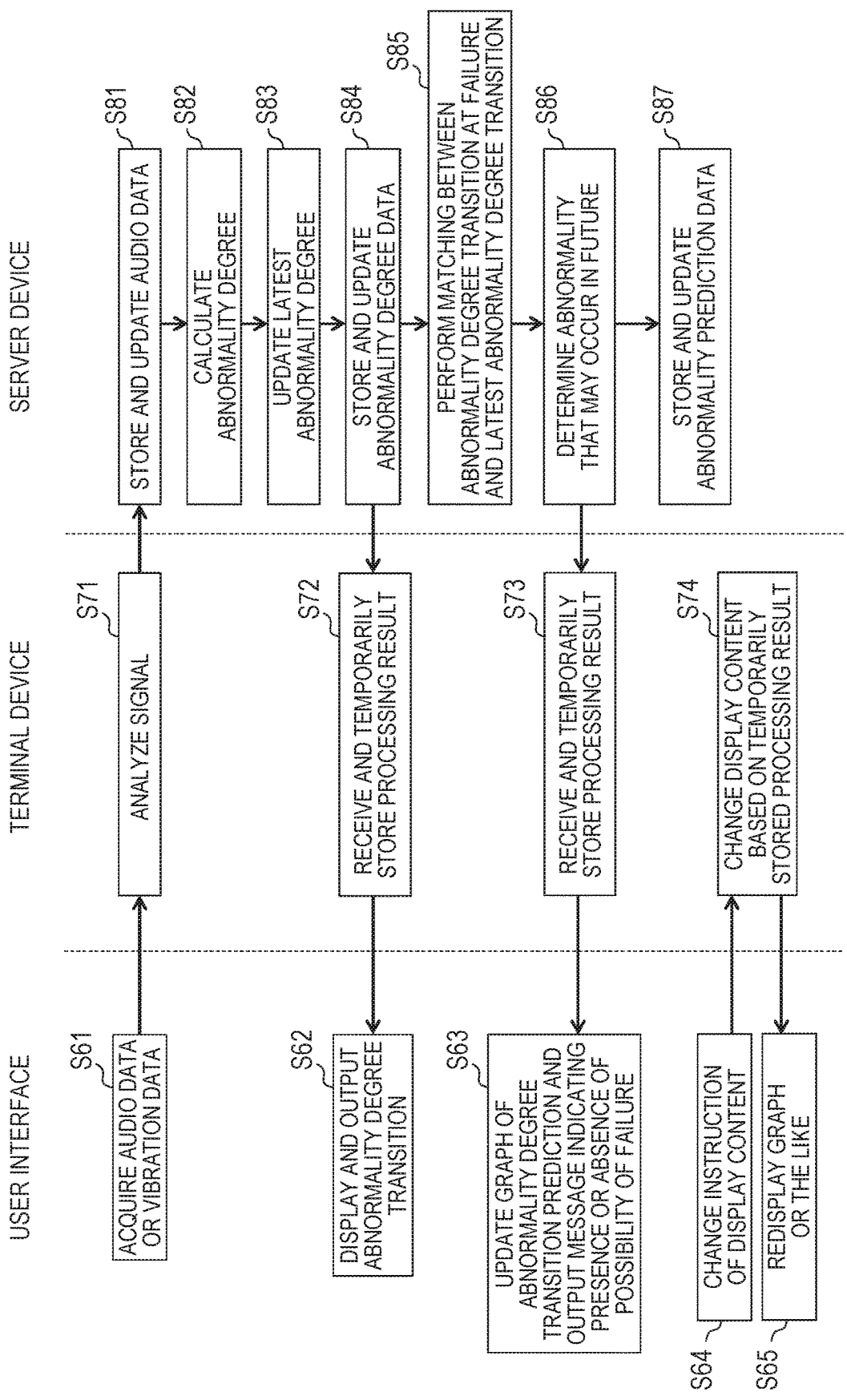
FIG. 14 is a sequence diagram showing an operation of the abnormality predicting system according to the second embodiment.

FIG. 14 is a sequence diagram showing an operation of the abnormality predicting system according to the second embodiment. FIG. 14 shows a flow of a processing performed by the microphone 61, the monitor 62, the keyboard 63 as the user interfaces, the terminal device 20, and the server device 40 in the abnormality predicting system according to the second embodiment.

The audio data (or vibration data) of the cooling fan 50, which is the target device, is collected and acquired by the microphone 61 (S61), and the terminal device 20 inputs the acquired audio data and analyzes a signal of the audio data (S71). Then, the terminal device 20 transmits the audio data after an analysis processing to the server device 40. The server device 40 inputs the audio data received from the terminal device 20, stores the audio data in the audio data storage unit 421, updates the audio data (S81), and calculates an abnormality degree for the audio data (S82). Next, the server device 40 updates a value of a latest abnormality degree according to the calculated abnormality degree (S83), stores data of the calculated abnormality degree in the abnormality degree storage unit 422, and updates abnormality degree data (S84). In addition, the server device 40 transmits data related to the calculated abnormality degree transition to the terminal device 20.

The terminal device 20 receives a processing result related to the abnormality degree transition from the server device 40, and temporarily stores the processing result in a storage unit by a memory or a storage device (S72). Then, the terminal device 20 displays and outputs a graph of the abnormality degree transition on the monitor 62 (S62). Accordingly, a graph display or the like of the abnormality degree transition up to the current time is displayed on the monitor 62.

Next, the server device 40 performs a matching processing between the abnormality degree transition at the time of the past failure and the latest abnormality degree transition (S85), and based on a result of the matching processing, determines whether there is an abnormality that may occur in the target device in the near future, and determines the possibility of failure (S86). In addition, the server device 40 transmits data related to the failure occurrence prediction to the terminal device 20. Then, the server device 40 stores the abnormality prediction data including the abnormality prediction result such as the failure occurrence possibility in the evaluation result storage unit 124, and updates the abnormality prediction data (S87).

The terminal device 20 receives the processing result related to the failure occurrence prediction from the server device 40, and temporarily stores the processing result in the storage unit (S73). Then, the terminal device 20 updates the graph of the abnormality degree transition prediction to be output to the monitor 62, and outputs a message display indicating the presence or absence of the possibility of failure (S63). Accordingly, on the display screen of the monitor 62, a graph display of the graph of the abnormality degree transition prediction is updated, and a message display indicating the presence or absence of the possibility of failure is displayed.

In addition, the terminal device 20 receives a change instruction of a display content from the keyboard 63 (S64), and based on data of the processing result temporarily stored in the storage unit, generates a monitor display screen according to the change instruction and changes the display content (S74). As the display content, it is possible to change various kinds of display information such as the range of the display section of the abnormality degree transition, the display mode of the graph, and display items of various kinds of information such as identification information and measurement conditions of the target device. Then, the terminal device 20 outputs the display screen after the display content is changed to the monitor 62, and redisplays a graph of the abnormality degree transition or the like (S65). Accordingly, the monitor display screen of the processing result of the display content according to the user operation is displayed on the monitor 62.

According to the present embodiment, the user can easily visually check and grasp the current abnormality degree transition and the abnormality degree transition predicted in the future without requiring specialized knowledge and know-how, and can easily perform the determination and prediction of the abnormal state. In addition, the user can easily confirm the prediction result of the abnormality degree transition in the near future and the prediction result of the possibility of failure, and can grasp a sign of the failure before the failure occurs in the target device.

In the present embodiment, a processing related to the abnormality prediction is distributed between and executed in a plurality of information processing devices connected via a network, a communication line, or the like. In particular, the calculation processing of the abnormality degree, the matching processing of the abnormality degree transitions, and the processing of the prediction of failure occurrence are executed by using an information processing device such as a server device having a high processing capability, so that it is easy to cope with complicated algorithm calculation, a high-speed processing, and the like. Processing related to the abnormality prediction may be appropriately allocated and executed for each processing in a plurality of information processing devices such as a local terminal device having a data input unit and a remote server device connected via a communication path. For example, each processing according to the present embodiment can be executed by an appropriate information processing device according to various conditions such as a system configuration, a use environment, an algorithm of data processing, a data amount, a data characteristic, and an output mode. Thus, by executing the processing in a distributed manner according to a system configuration of the abnormality predicting system, it is possible to efficiently and quickly obtain evaluation results of the abnormality degree analysis and the abnormality prediction such as the failure occurrence prediction.

Third Embodiment

Figure 15:
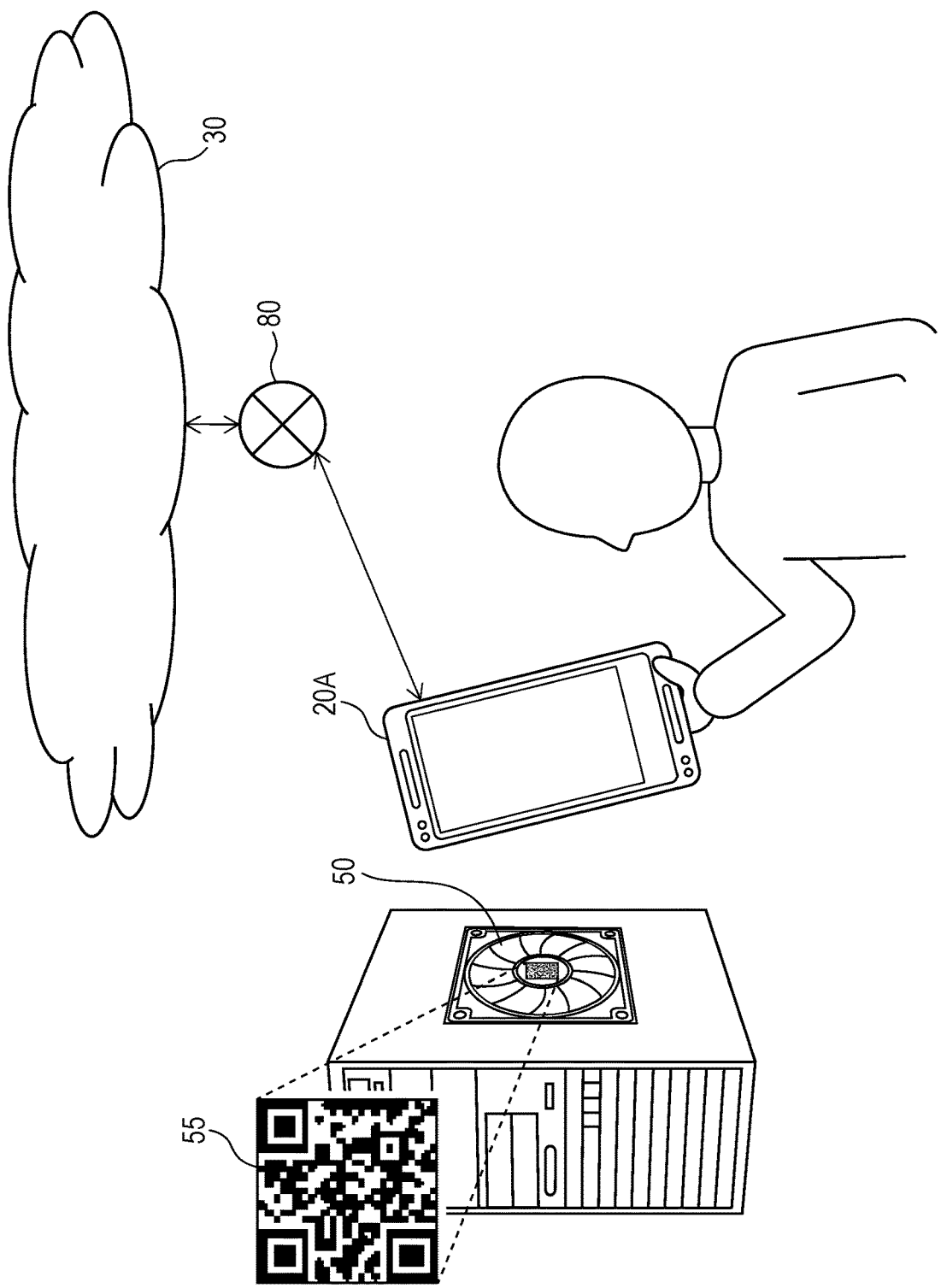
FIG. 15 is a diagram showing an example of a schematic configuration of an abnormality predicting system according to a third embodiment.

FIG. 15 is a diagram showing an example of a schematic configuration of an abnormality predicting system according to a third embodiment. The abnormality predicting system according to the third embodiment is a modification of the second embodiment, and is a configuration example in which a mobile communication terminal 20A such as a smartphone having a microphone (an example of the sound collection unit), a monitor (an example of the display unit), and a camera (an example of an image capturing unit) is used as a terminal device. The mobile communication terminal 20A is connected to a network using wireless communication such as a mobile network or a wireless LAN, and is connected to the cloud computer 30 including a server device via the communication path 80 such as a wired or wireless network or a communication line. The mobile communication terminal 20A has a similar function as that of the terminal device 20 according to the second embodiment. Here, portions different from the second embodiment will be described.

The cooling fan 50 of the computer as the target device is provided with an identification mark 55 including identification information of the target device. The identification mark 55 may be provided near the target device, such as around the target device, and may be appropriately disposed within a range in which a measurement distance and a measurement position with respect to the target device can be defined. As the identification mark 55, various codes or images formed in a predetermined size such as a two-dimensional code such as a QR code (registered trademark), a bar code, and a color code can be used. By capturing an image of the identification mark 55 with a camera of an own device, the mobile communication terminal 20A can acquire the identification information of the target device, and can secure a defined measurement distance from the microphone of the own device to the target device according to a size of the identification mark 55 that is captured.

Figure 16:
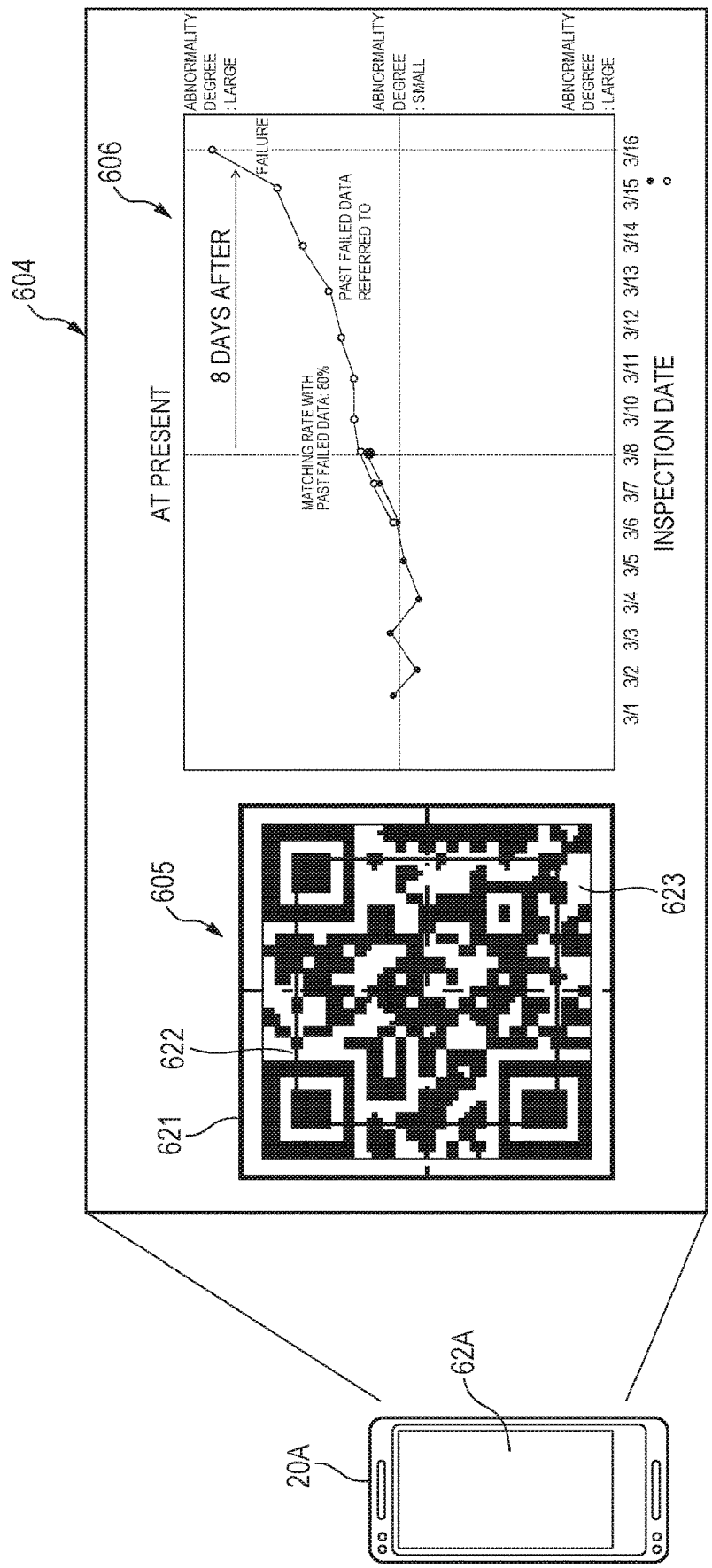
FIG. 16 is a diagram showing an example of a display screen of a terminal device in the abnormality predicting system according to the third embodiment.

FIG. 16 is a diagram showing an example of a display screen of a terminal device in the abnormality predicting system according to the third embodiment. When the audio data of the cooling fan 50 is collected and acquired, the user shoots an image of the identification mark 55 with the camera of the mobile communication terminal 20A. The mobile communication terminal 20A displays a captured image display portion 605 of an identification mark and a processing result display portion 606 including the abnormality degree transition on a display screen 604 displayed on a display 62A. In the captured image display unit 605, guide frames 621 and 622 as guide displays indicating an upper limit and a lower limit of the size of the identification mark are displayed, and a captured identification mark image 623 is displayed. Since the user holds the mobile communication terminal 20A such that an outer shape of the identification mark image 623 fits between the outer guide frame 621 and the inner guide frame 622, the measurement position and the measurement distance of the target device (cooling fan 50) can be secured. Accordingly, when the abnormality degree transition is continuously acquired and failure determination is executed, it is possible to acquire the audio data measured at the same measurement position and the same measurement distance which are normally appropriate. When the identification mark image 623 falls within ranges of the guide frames 621 and 622, the mobile communication terminal 20A inputs the audio data of the cooling fan 50 collected by the microphone, and executes a subsequent processing.

In a state where the identification mark image 623 is between the guide frames 621 and 622 in the captured image display portion 605, the mobile communication terminal 20A collects the sound of the cooling fan 50 using the microphone of the own device and acquires the audio data. At this time, when the identification mark image 623 is within the ranges of the guide frames 621 and 622 in a state where the user turns on a record button, the mobile communication terminal 20A starts to collect the sound by the microphone. Alternatively, when the identification mark image 623 is within the ranges of the guide frames 621 and 622, the record button may be activated, and then the user may operate the record button to start sound collection. A subsequent processing is similar to that of the second embodiment.

According to the present embodiment, the user can easily visually check and grasp the current abnormality degree transition and the abnormality degree transition predicted in the future without requiring specialized knowledge and know-how, and can easily perform the determination and prediction of the abnormal state. In addition, the user can easily confirm the prediction result of the abnormality degree transition in the near future and the prediction result of the possibility of failure, and can grasp a sign of the failure before the failure occurs in the target device.

As in the present embodiment, by setting the measurement position and the measurement distance by a camera captured image, acquiring the audio data, and displaying a processing result using a mobile communication terminal, it is possible to easily perform grasping of the abnormality degree transition, determination of the abnormal state, prediction of the possibility of failure, and the like. In addition, since the system can be configured by connecting a mobile communication terminal having corresponding application software to a server device that executes a processing related to the abnormality prediction, the abnormality predicting system can be easily implemented in various environments.

Fourth Embodiment

Figure 17:
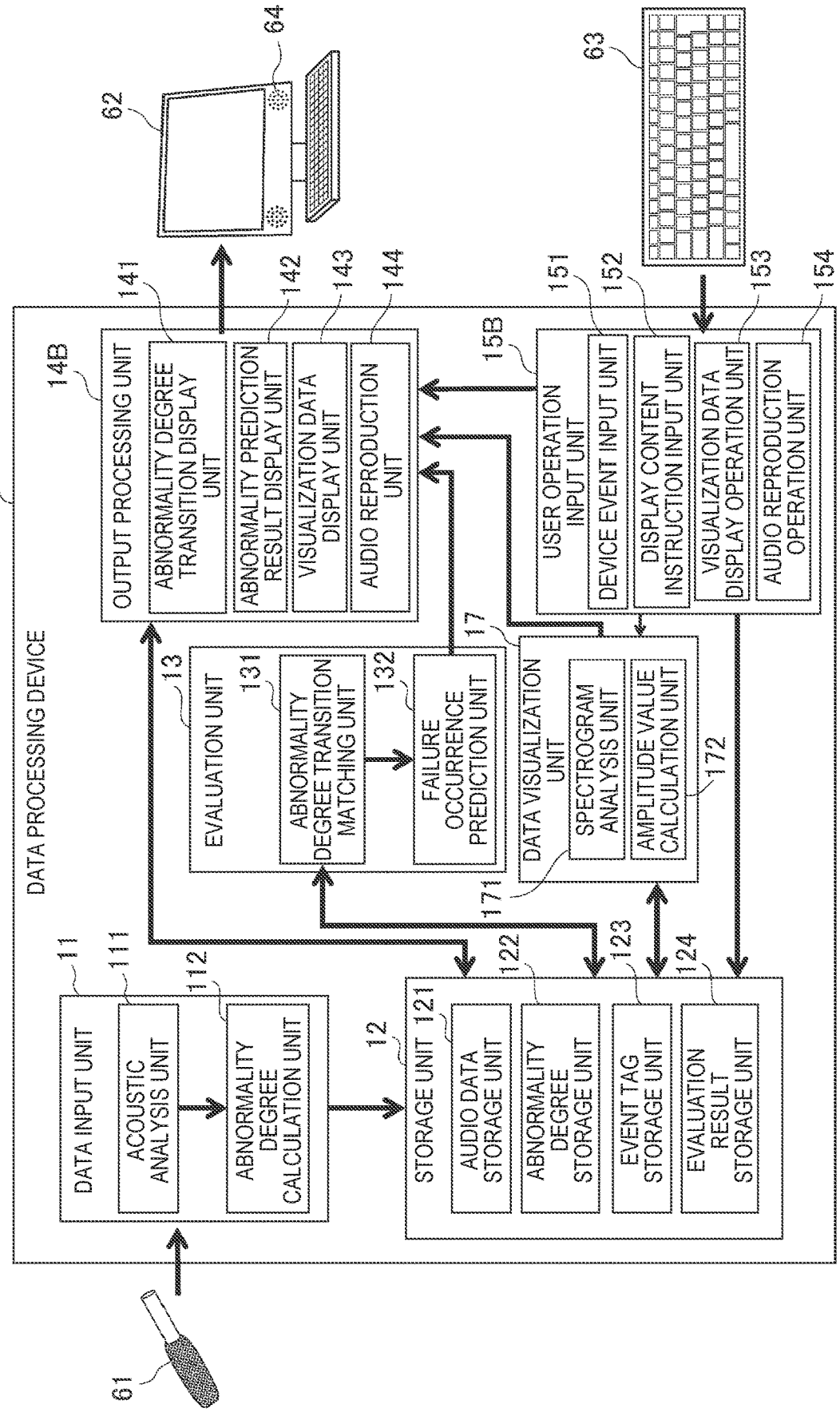
FIG. 17 is a block diagram showing an example of a functional configuration of an abnormality predicting system according to a fourth embodiment.

FIG. 17 is a block diagram showing an example of a functional configuration of an abnormality predicting system according to a fourth embodiment. The abnormality predicting system of the fourth embodiment is a configuration example having a reproduction function of the audio data and a visualization function of the audio data in addition to the configuration of the first embodiment. Here, portions different from the first embodiment will be mainly described, and a description of similar configurations and functions is omitted.

A data processing device 10B is configured by an information processing device having a processor and a memory, and the data processing device 10B includes the data input unit 11, the storage unit 12, the evaluation unit 13, an output processing unit 14B, a user operation input unit 15B, and a data visualization unit 17.

The data visualization unit 17 includes a spectrogram analysis unit 171 and an amplitude value calculation unit 172, and executes a visualization processing of generating visualization data of a sound physical quantity, such as a generation processing of a spectrogram of the audio data and a calculation processing of an amplitude value with passage of time of the audio data. The spectrogram analysis unit 171 refers to the audio data associated with designated inspection information, calculates a frequency spectrum of the audio data by a spectrogram analysis processing, and generates a spectrogram in which characteristics of a temporal change of each frequency component are imaged. The inspection information includes various inspection attributes such as a date and time at the time of acquisition related to the acquired audio data, and a target device or a site. In the generation processing of the spectrogram, the spectrogram analysis unit 171 performs Fourier transform, wavelet transform, and the like on the audio data to calculate time-frequency characteristics. When generating the spectrogram, a compression processing according to a representative value of a predetermined frequency band may be added. The data visualization unit 17 outputs visualization data based on the generated spectrogram to a visualization data display unit 143.

The amplitude value calculation unit 172 refers to the audio data associated with the designated inspection information, calculates an amplitude value of the audio data for each predetermined time, and generates a time transition graph representing a time transition of a sound volume. The data visualization unit 17 outputs the visualization data based on the generated time transition graph of the sound volume to the visualization data display unit 143. The data visualization unit 17 may generate the visualization data of not only the spectrogram and the time transition of the sound volume but also other sound physical quantities.

The output processing unit 14B includes a video interface to which the monitor 62 is connected and an audio interface to which a speaker 64 is connected, and includes the abnormality degree transition display unit 141, the abnormality prediction result display unit 142, the visualization data display unit 143, and an audio reproduction unit 144. The output processing unit 14B executes an image processing for the monitor display and a reproduction processing of the audio data. The visualization data display unit 143 generates a display screen for displaying the visualization data such as a spectrogram of sound and a time transition graph of the sound volume based on a visualization processing of the audio data by the data visualization unit 17. The audio reproduction unit 144 performs decoding, signal amplification, and the like of the audio data, and outputs an audio signal for reproduction to the speaker 64.

The user operation input unit 15B includes an input interface for connecting the keyboard 63 and a pointer device such as a mouse (not shown), and includes the device event input unit 151, the display content instruction input unit 152, a visualization data display operation unit 153, and an audio reproduction operation unit 154. The visualization data display operation unit 153 receives a selection instruction of the audio data to be visualized, which is input by a user operation, and inputs inspection information of sound to be visualized, which designates the audio data to be visualized, to the data visualization unit 17 and the storage unit 12. In addition, the visualization data display operation unit 153 inputs visualization display information including a display mode of the visualization data to the output processing unit 14B. The audio reproduction operation unit 154 receives a selection instruction of audio data to be reproduced, which is input by a user operation, and inputs inspection information of sound to be reproduced, which designates the audio data to be reproduced, to the output processing unit 14B and the storage unit 12.

Next, some examples of a display screen displayed on the monitor 62 in the abnormality predicting system according to the fourth embodiment are described.

Figure 18:
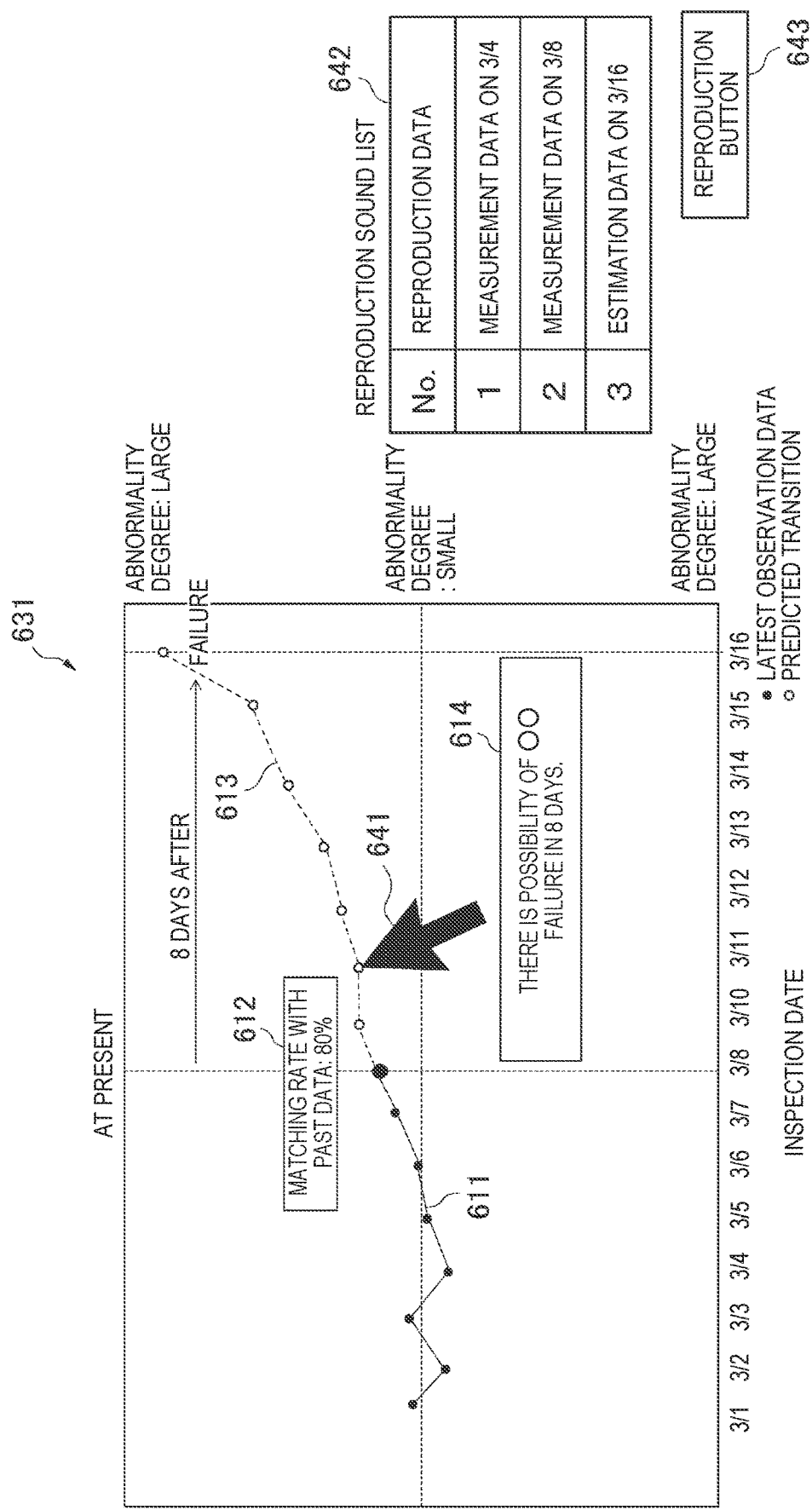
FIG. 18 is a diagram showing a first example of a monitor display screen in the abnormality predicting system according to the fourth embodiment.

FIG. 18 is a diagram showing a first example of a monitor display screen in the abnormality predicting system according to the fourth embodiment. On the monitor display screen of an illustrated example, image data for monitor display is generated by the output processing unit 14B, and is output to and displayed on the monitor 62.

A first example of the fourth embodiment is an example of the monitor display screen when the audio data is reproduced and output. On a monitor display screen 631, similar to the first embodiment, the current abnormality degree transition 611, the matching rate 612 of the abnormality degree transitions, the future prediction abnormality degree transition 613, and the message 614 indicating that there is a possibility of failure are displayed. On the monitor display screen 631, a cursor 641 for designating the audio data to be reproduced is displayed. In the first example of the fourth embodiment, the data processing device 10B receives a selection instruction of the audio data to be reproduced by a user operation such as a click operation or the like by instructing predetermined audio data among points indicating each audio data with the cursor 641 in the abnormality degree transitions 611 and 613 of the monitor display screen. The data processing device 10B inputs inspection information of the selected and instructed sound to be reproduced, reproduces and outputs the audio data associated with the designated inspection information, and outputs an audio signal from the speaker 64 to reproduce the audio signal. As the audio data to be reproduced, it is possible to reproduce the audio data of each of the past, current time, and future predictions, such as the audio data (measurement data) in which the past observation data is stored, and the audio data (estimation data) which is predicted to have a high possibility of failure (a high abnormality degree) based on a prediction result of a future abnormality degree transition based on the past observation data.

The data processing device 10B receives a selection instruction of a plurality of pieces of audio data to be reproduced by a user operation such as a click operation or the like by instructing a plurality of pieces of audio data with the cursor 641 in the abnormality degree transitions 611 and 613 of the monitor display screen. In this case, the data processing device 10B generates a reproduction sound list 642 for displaying a list of reproduction data of a plurality of pieces of selected audio data, and displays the reproduction sound list 642 and a reproduction button 643 for inputting a reproduction instruction on the monitor display screen 631. In an illustrated example, a case where measurement data on March 4, measurement data on March 8, and estimation data on March 16 is selected as the reproduction data is shown. When the user confirms the audio data of the reproduction sound list 642 and performs a reproduction instruction operation by a click operation or the like of the reproduction button 643, the data processing device 10B continuously reproduces a plurality of pieces of selected audio data in the reproduction sound list 642. In the illustrated example, the measurement data on March 4, the measurement data on March 8, and the estimation data on March 16 is continuously reproduced. For example, when the abnormality degree increases with passage of time, the user can confirm a change in sound with respect to the abnormality degree by selecting and continuously reproducing a plurality of pieces of audio data. Accordingly, a relevance between the abnormality degree and reproduction sound of the audio data can be fed back to the user.

Figure 19:
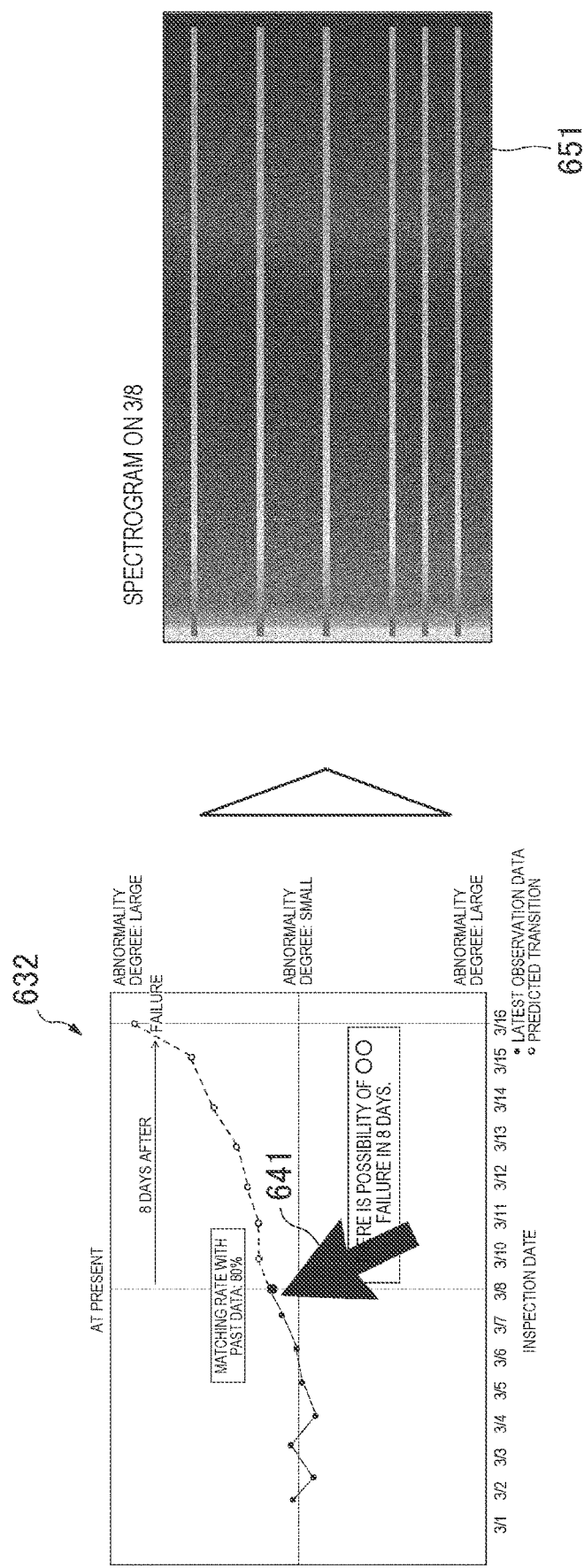
FIG. 19 is a diagram showing a second example of the monitor display screen in the abnormality predicting system according to the fourth embodiment.

FIG. 19 is a diagram showing a second example of the monitor display screen in the abnormality predicting system according to the fourth embodiment. The second example of the fourth embodiment is an example of the monitor display screen when the audio data is visualized and displayed by a spectrogram.

On the monitor display screen 632, similar to the first embodiment, the current abnormality degree transition and the future prediction abnormality degree transition are displayed, and further, the cursor 641 for designating audio data to be visualized and displayed is displayed. In the second example of the fourth embodiment, the data processing device 10B receives a selection instruction of the audio data to be visualized by a user operation such as a click operation or the like by instructing predetermined audio data among points indicating each audio data with the cursor 641 in the abnormality degree transition of the monitor display screen. The data processing device 10B inputs the inspection information of the selected and instructed sound to be visualized, generates visualization data of the audio data associated with the designated inspection information, and displays visualization data 651 of the spectrogram on the monitor display screen 632. In an illustrated example, a spectrogram corresponding to the audio data on March 8 is shown as the visualization data, and a horizontal axis represents time and a vertical axis represents frequency. Based on the spectrogram, a change in a peak of a frequency characteristic at the time of abnormality, an increase or decrease in the peak, and the like can be grasped. As the audio data to be visualized and displayed, it is possible to display visualization information of the audio data of each of the past, current time, and future predictions, such as the audio data (measurement data) in which the past observation data is stored, and the audio data (estimation data) which is predicted to have a high possibility of failure (a high abnormality degree) based on a prediction result of a future abnormality degree transition based on the past observation data.

Figure 20:
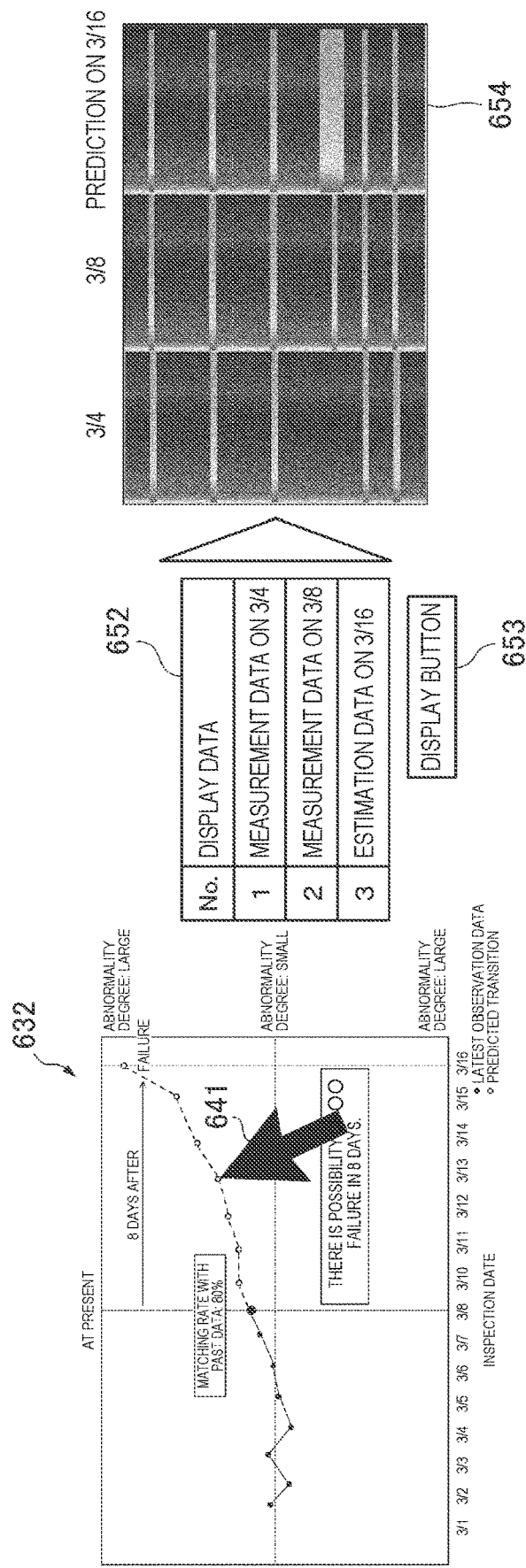
FIG. 20 is a diagram showing a case where a plurality of pieces of visualization data is displayed on the monitor display screen of FIG. 19.

FIG. 20 is a diagram showing a case where a plurality of pieces of visualization data is displayed on the monitor display screen of FIG. 19. FIG. 20 shows an example in which a plurality of spectrograms are displayed side by side.

The data processing device 10B receives a selection instruction of a plurality of pieces of audio data to be visualized by a user operation such as a click operation or the like by instructing a plurality of pieces of audio data with the cursor 641 in the abnormality degree transition of the monitor display screen 632. In this case, the data processing device 10B generates a display sound list 652 for displaying a list of display data of a plurality of pieces of selected audio data, and displays the display sound list 652 and a display button 653 for inputting a display instruction on the monitor display screen 632. In an illustrated example, a case where the measurement data on March 4, the measurement data on March 8, and the estimation data on March 16 is selected as the display data is shown. When the user confirms the audio data of the display sound list 652 and performs a visualization instruction operation by a click operation or the like of the display button 653, the data processing device 10B generates a plurality of pieces of selected visualization data of the audio data in the display sound list 652. Then, the data processing device 10B displays visualization data 654 in which a plurality of spectrograms are connected on the monitor display screen 632. In the illustrated example, spectrograms of the measurement data on March 4, the measurement data on March 8, and the estimation data on March 16 are displayed side by side. For example, when the abnormality degree increases with passage of time, the user can easily confirm a change in the frequency characteristic with respect to the abnormality degree by the visualization data by selecting and visualizing and displaying a plurality of pieces of audio data. Accordingly, a relevance between the abnormality degree and a sound characteristic of the audio data can be fed back to the user.

Figure 21:
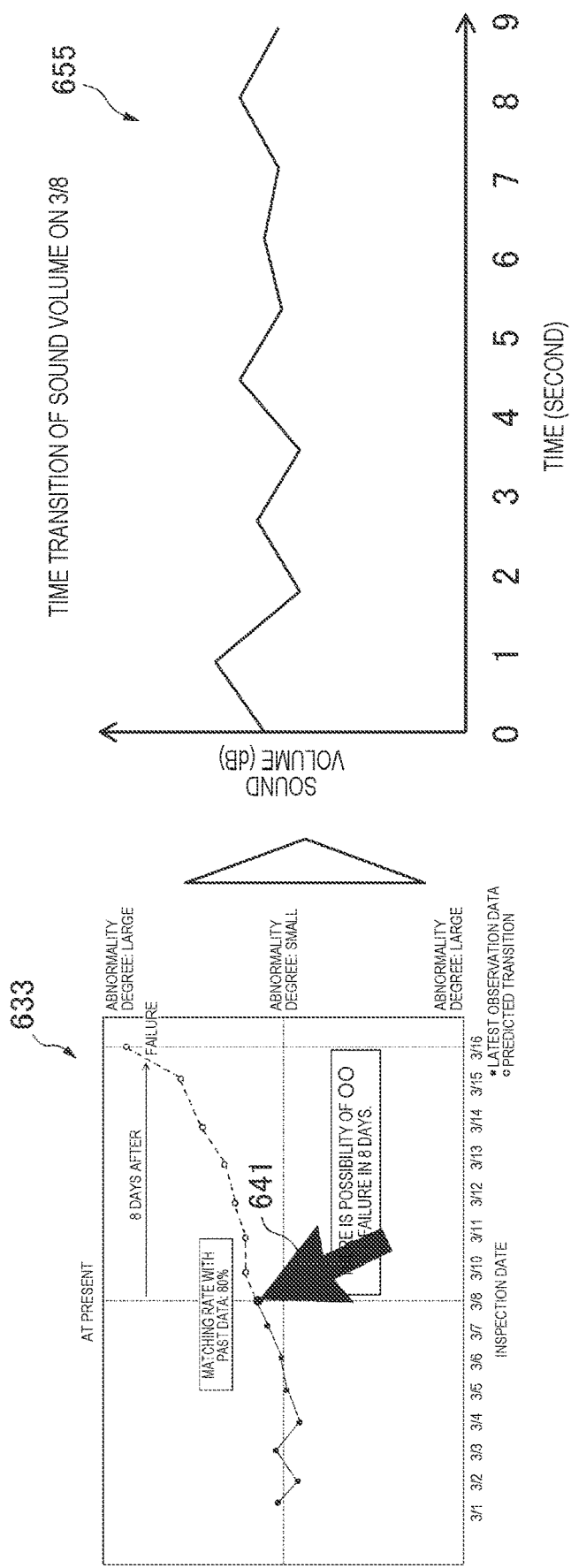
FIG. 21 is a diagram showing a third example of the monitor display screen in the abnormality predicting system according to the fourth embodiment.

FIG. 21 is a diagram showing a third example of the monitor display screen in the abnormality predicting system according to the fourth embodiment. The third example of the fourth embodiment is an example of the monitor display screen when the audio data is visualized and displayed by a time transition graph of the sound volume.

On the monitor display screen 633, similar to the first embodiment, the current abnormality degree transition and the future prediction abnormality degree transition are displayed, and further, the cursor 641 for designating audio data to be visualized and displayed is displayed. In the third example of the fourth embodiment, the data processing device 10B receives a selection instruction of the audio data to be visualized by a user operation such as instructing predetermined audio data with the cursor 641 in the abnormality degree transition. The data processing device 10B inputs the inspection information of the selected and instructed sound to be visualized, generates visualization data of the audio data associated with the designated inspection information, and displays visualization data 655 of the time transition graph of the sound volume on the monitor display screen 633. In an illustrated example, a time transition graph representing time transition of the sound volume corresponding to the audio data on March 8 is shown as the visualization data, and the horizontal axis represents time and the vertical axis represents a sound pressure level of the sound volume. Based on the time transition graph of the sound volume, it is possible to grasp a level change of the sound volume and an increase in the sound volume at the time of abnormality. Similar to the spectrogram, with respect to the time transition of the sound volume, it is possible to display the visualization information of the audio data of each of the past, current time, and future predictions, such as the past measurement data and the estimation data based on the future prediction result.

Figure 22:
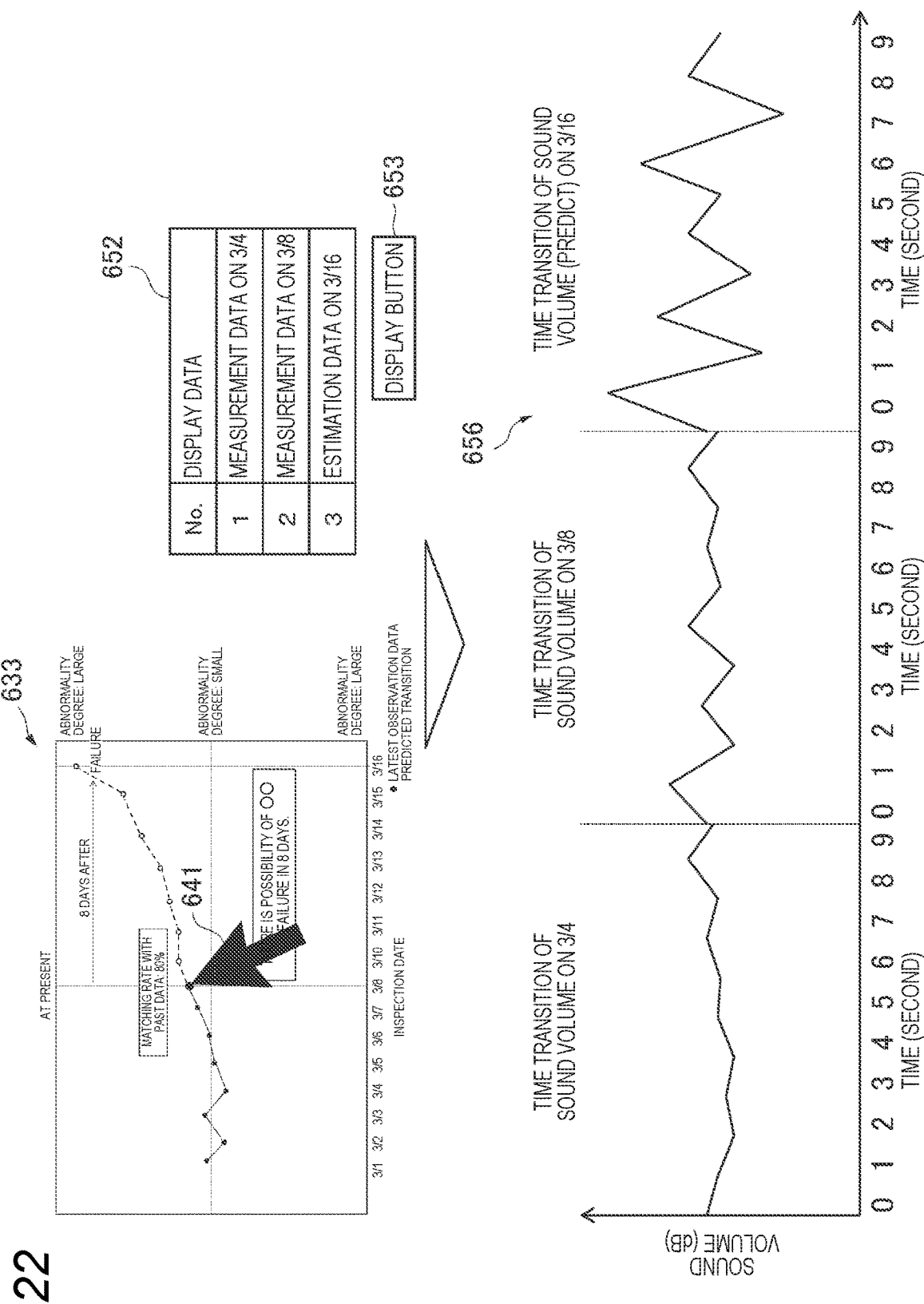
FIG. 22 is a diagram showing an example of a case where a plurality of pieces of visualization data is displayed on the monitor display screen of FIG. 21.

FIG. 22 is a diagram showing an example of a case where a plurality of pieces of visualization data is displayed on the monitor display screen of FIG. 21. FIG. 22 shows an example in which a plurality of time transition graphs of the sound volume are displayed side by side.

The data processing device 10B receives a selection instruction of a plurality of pieces of audio data to be visualized by a user operation such as a click operation or the like by instructing a plurality of pieces of audio data with the cursor 641 in the abnormality degree transition of the monitor display screen 633. In this case, the data processing device 10B displays the display sound list 652 and the display button 653 on the monitor display screen 633 similar to the example of the spectrogram shown in FIG. 20. When the user confirms the audio data of the display sound list 652 and performs a visualization instruction operation by a click operation or the like of the display button 653, the data processing device 10B generates a plurality of pieces of selected visualization data of the audio data in the display sound list 652. Then, the data processing device 10B displays visualization data 656 in which a plurality of time transition graphs of the sound volume are connected in a horizontal direction on the monitor display screen 633. In an illustrated example, the time transition graphs of the sound volume of the measurement data on March 4, the measurement data on March 8, and the estimation data on March 16 are displayed side by side in a state where the sound volume on the vertical axis is shared. This makes it possible to compare a level change and a time transition of the sound volume. Thus, by displaying the plurality of time transition graphs of the sound volume side by side, the user can easily confirm the time transition of the sound volume accompanying a change of the abnormality degree by the visualization data.

Figure 23:
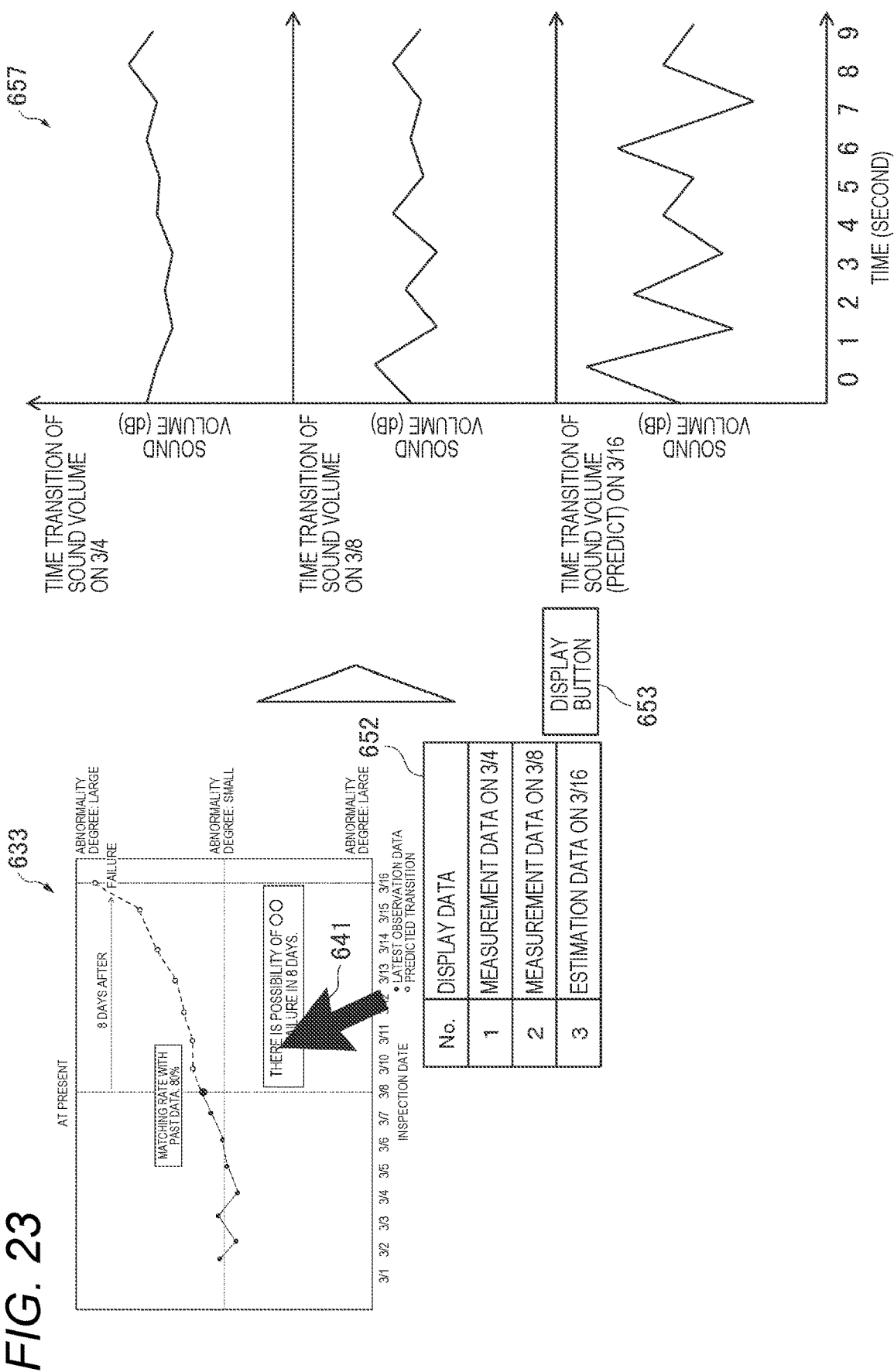
FIG. 23 is a diagram showing another example of the case where a plurality of pieces of visualization data is displayed on the monitor display screen of FIG. 21.

FIG. 23 is a diagram showing another example of the case where a plurality of visualization data is displayed on the monitor display screen of FIG. 21. FIG. 23 shows another example in which a plurality of time transition graphs of the sound volume are displayed side by side. Here, portions different from those in FIG. 22 will be described.

When the data processing device 10B receives a visualization instruction operation by a click operation or the like of the display button 653, the data processing device 10B generates the visualization data of the audio data of a plurality of pieces of selected audio data in the display sound list 652. Then, the data processing device 10B displays visualization data 657 in which a plurality of time transition graphs of the sound volume are connected in a vertical direction on the monitor display screen 633. In an illustrated example, the time transition graphs of the sound volume of the measurement data on March 4, the measurement data on March 8, and the estimation data on March 16 are displayed side by side in a state where time on the horizontal axis is shared. This makes it possible to compare changes in the sound volume in units of time. Thus, by displaying the plurality of time transition graphs of the sound volume side by side, the user can easily confirm the time transition of the sound volume for each date based on the visualization data.

Next, an example of a processing procedure related to reproduction and visualization of audio data in the abnormality predicting system according to the fourth embodiment will be described.

Figure 24:
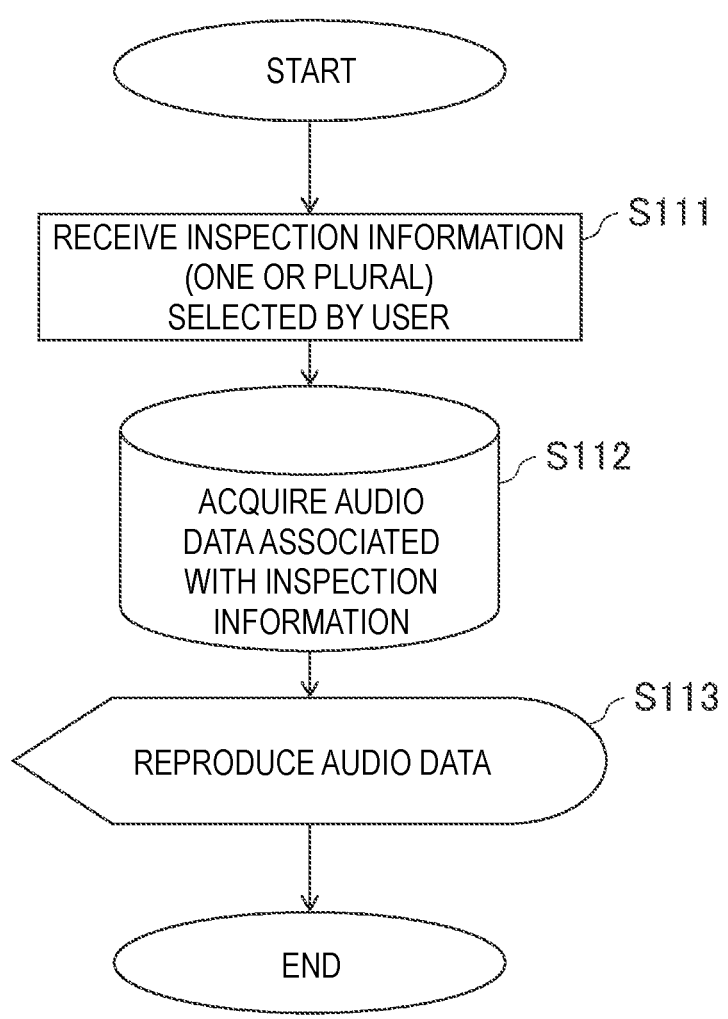
FIG. 24 is a flowchart showing an example of a procedure of a reproduction processing of audio data according to the fourth embodiment.

FIG. 24 is a flowchart showing an example of a procedure of a reproduction processing of audio data according to the fourth embodiment. The data processing device 10B receives a selection instruction of the audio data to be reproduced, which is input from the keyboard 63 or the like by a user operation, and receives inspection information corresponding to one or a plurality of pieces of audio data selected by the user in the audio reproduction operation unit 154 of the user operation input unit 15B (S111). Then, the data processing device 10B acquires audio data associated with the designated inspection information from the audio data storage unit 121 in the audio reproduction unit 144 of the output processing unit 14B (S112). Subsequently, the data processing device 10B reproduces the acquired audio data in the audio reproduction unit 144 of the output processing unit 14B, and outputs the audio data to the speaker 64 to reproduce the audio data (S113). Accordingly, the predetermined audio data selected by the user is reproduced, and the user can listen to and confirm desired audio data.

Figure 25:
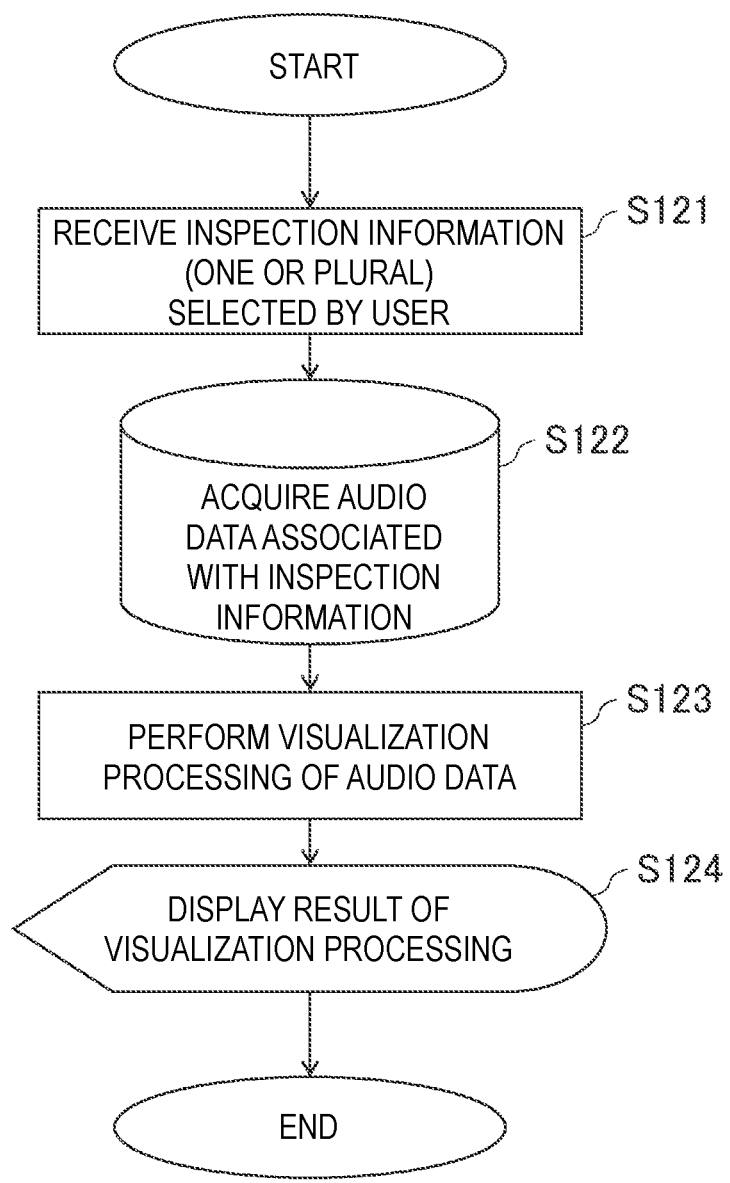
FIG. 25 is a flowchart showing an example of a procedure of a visualization processing of the audio data according to the fourth embodiment.

FIG. 25 is a flowchart showing an example of a procedure of a visualization processing of the audio data according to the fourth embodiment. The data processing device 10B receives a selection instruction of the audio data to be visualized and displayed, which is input from the keyboard 63 or the like by a user operation, and receives inspection information corresponding to one or a plurality of pieces of audio data selected by the user in the audio reproduction operation unit 154 of the user operation input unit 15B (S121). Then, the data processing device 10B acquires audio data associated with the designated inspection information from the audio data storage unit 121 in the data visualization unit 17 (S122). Subsequently, the data processing device 10B performs a visualization processing of the audio data, and generates visualization data such as a spectrogram and a time transition graph of the sound volume of the selected audio data in the data visualization unit 17 (S123). Then, the data processing device 10B generates a display screen for displaying the visualization data of a visualization processing result in the visualization data display unit 143 of the output processing unit 14B, and outputs and displays the generated display screen on the monitor 62 (S124). Accordingly, the visualization information of the predetermined audio data selected by the user is displayed, and the user can visually confirm characteristics of the desired audio data.

Figure 26:
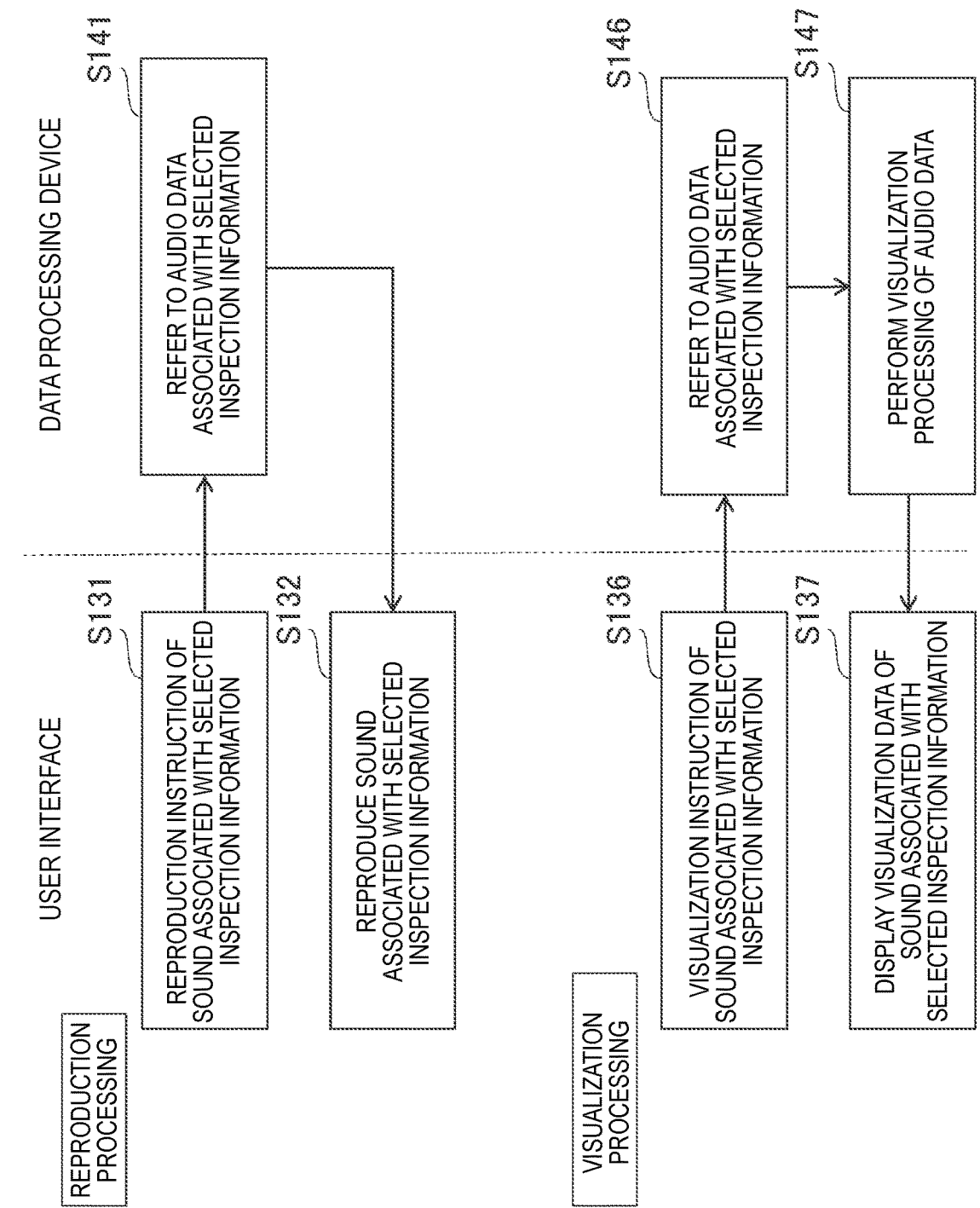
FIG. 26 is a sequence diagram showing an operation of the abnormality predicting system according to the fourth embodiment.

FIG. 26 is a sequence diagram showing an operation of the abnormality predicting system according to the fourth embodiment. FIG. 26 shows a flow of a processing performed by the monitor 62, the keyboard 63, and the speaker 64 as the user interfaces, and the data processing device 10B in the abnormality predicting system according to the fourth embodiment.

When the reproduction processing of the audio data is performed, a reproduction instruction of the sound associated with the inspection information selected by the user is input based on the user operation from the keyboard 63 or the like (S131). The data processing device 10B inputs the selected inspection information in the user operation input unit 15B. Then, the data processing device 10B refers to the audio data associated with the inspection information selected from the audio data stored in the storage unit 12, and performs a reproduction processing of the audio data by the output processing unit 14B to output the audio data (S141). Accordingly, the sound associated with the selected inspection information is reproduced and output from the speaker 64 (S132).

When the visualization processing of the audio data is performed, a visualization instruction of the sound associated with the inspection information selected by the user is input based on the user operation from the keyboard 63 or the like (S136). The data processing device 10B inputs the selected inspection information in the user operation input unit 15B, and refers to the audio data associated with the selected inspection information from the audio data stored in the storage unit 12 (S146). Then, the data processing device 10B performs the visualization processing of the audio data by the data visualization unit 17, and outputs the visualization data by the output processing unit 14B (S147). Accordingly, the visualization data of the sound associated with the selected inspection information is displayed and output on the monitor 62 by a spectrogram, a time transition graph of the sound volume, or the like (S137).

As described above, in the present embodiment, the audio data selected by the user is reproduced or visualized and displayed using a prediction result of the abnormality degree transition and a prediction result of the possibility of failure. Accordingly, the user can recognize the audio data acquired in the target device in association with the abnormality degree or the possibility of failure with the prediction results related to the audio data. For example, by designating and reproducing the desired audio data, it is possible to easily confirm the relevance between the abnormality degree and reproduction sound. In addition, by designating the desired audio data and visualizing the sound physical quantity, it is possible to easily confirm the relevance between the abnormality degree and the sound characteristic.

Fifth Embodiment

Figure 27:
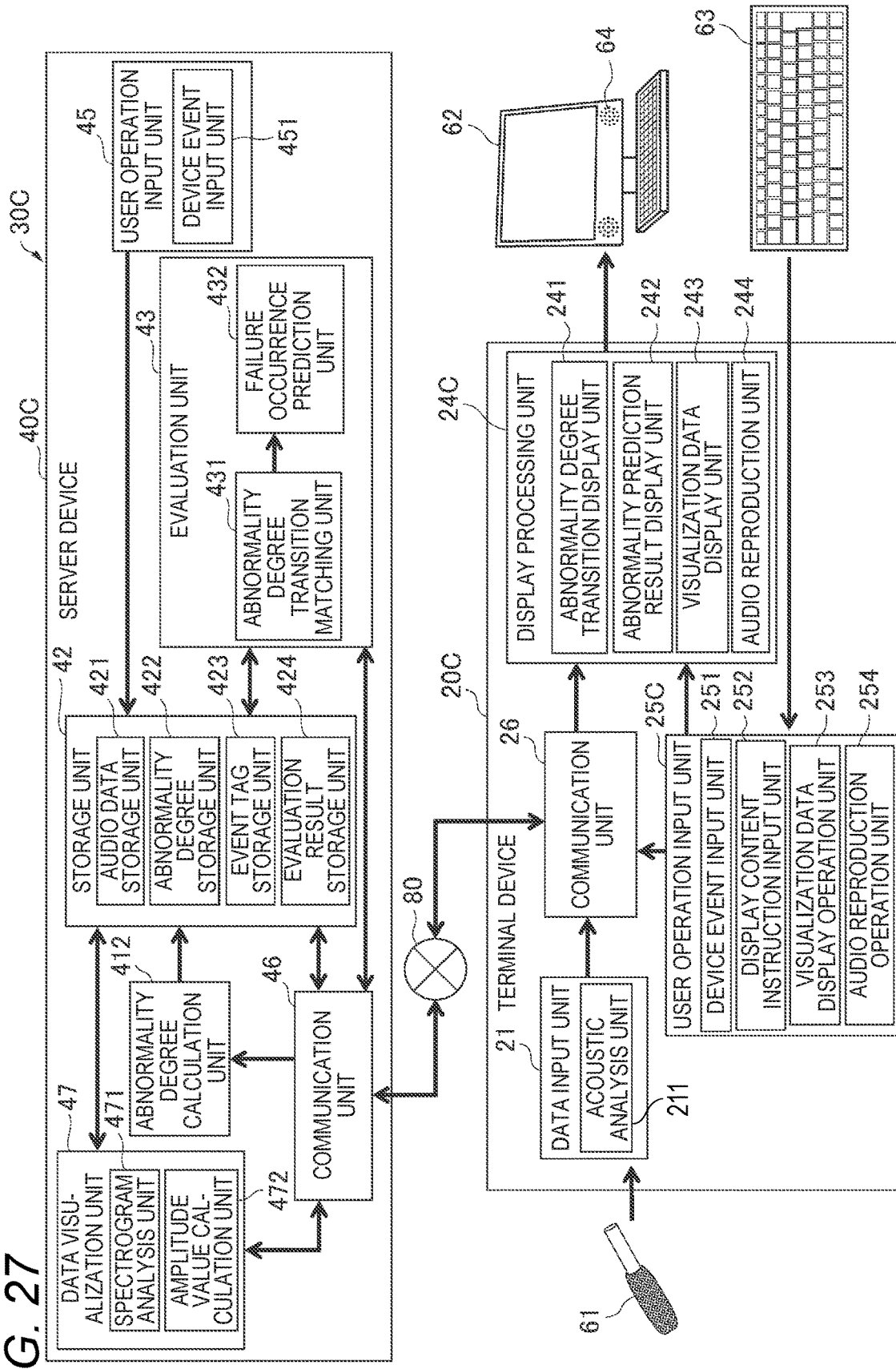
FIG. 27 is a block diagram showing an example of a functional configuration of an abnormality predicting system according to a fifth embodiment.

FIG. 27 is a block diagram showing an example of a functional configuration of an abnormality predicting system according to a fifth embodiment. The abnormality predicting system of the fifth embodiment is a configuration example having a reproduction function of the audio data and a visualization function of the audio data similar to the fourth embodiment, in addition to the configuration of the second embodiment. Here, portions different from the second embodiment and the fourth embodiment will be mainly described, and a description of similar configurations and functions is omitted.

A terminal device 20C is configured by an information processing device having a processor and a memory, and the terminal device 20C includes the data input unit 21, an output processing unit 24C, a user operation input unit 25C, and the communication unit 26. The output processing unit 24C includes the abnormality degree transition display unit 241, the abnormality prediction result display unit 242, a visualization data display unit 243, and an audio reproduction unit 244 similar to those of the output processing unit 14B of the fourth embodiment. The user operation input unit 25C includes the device event input unit 251, the display content instruction input unit 252, a visualization data display operation unit 253, and an audio reproduction operation unit 254 similar to those of the user operation input unit 15B of the fourth embodiment. The communication unit 26 has a wired or wireless communication interface, and communicates with a server device 40C of a cloud computer 30C via the communication path 80.

The server device 40C is configured by an information processing device having a processor and a memory, and the server device 40C includes the abnormality degree calculation unit 412, the storage unit 42, the evaluation unit 43, the user operation input unit 45, the communication unit 46, and a data visualization unit 47. The data visualization unit 47 includes a spectrogram analysis unit 471 and an amplitude value calculation unit 472 similar to those of the data visualization unit 17 of the fourth embodiment. The communication unit 46 communicates with the terminal device 20C via the communication path 80, and transmits and receives audio data, audio data after an analysis processing, abnormality degree data, an event tag, evaluation result data of an abnormality prediction, visualization data, and the like to and from the terminal device 20C.

In the fifth embodiment, the terminal device 20C acquires the audio data of the target device, displays the processing results of the abnormality degree transition, the failure occurrence prediction, and the like, reproduces and outputs the audio data, and displays the visualization data of the sound. The server device 40C executes a processing with a relatively large processing load such as calculation of an abnormality degree, a failure occurrence prediction, and generation of visualization data. The server device 40C can be formed by one or a plurality of servers (information processing devices). For example, the server device 40C may be configured by a plurality of servers including a storage server that stores various types of data and a processing server that executes various types of processing. Some functions in the server device 40C may be provided in another server.

Figure 28:
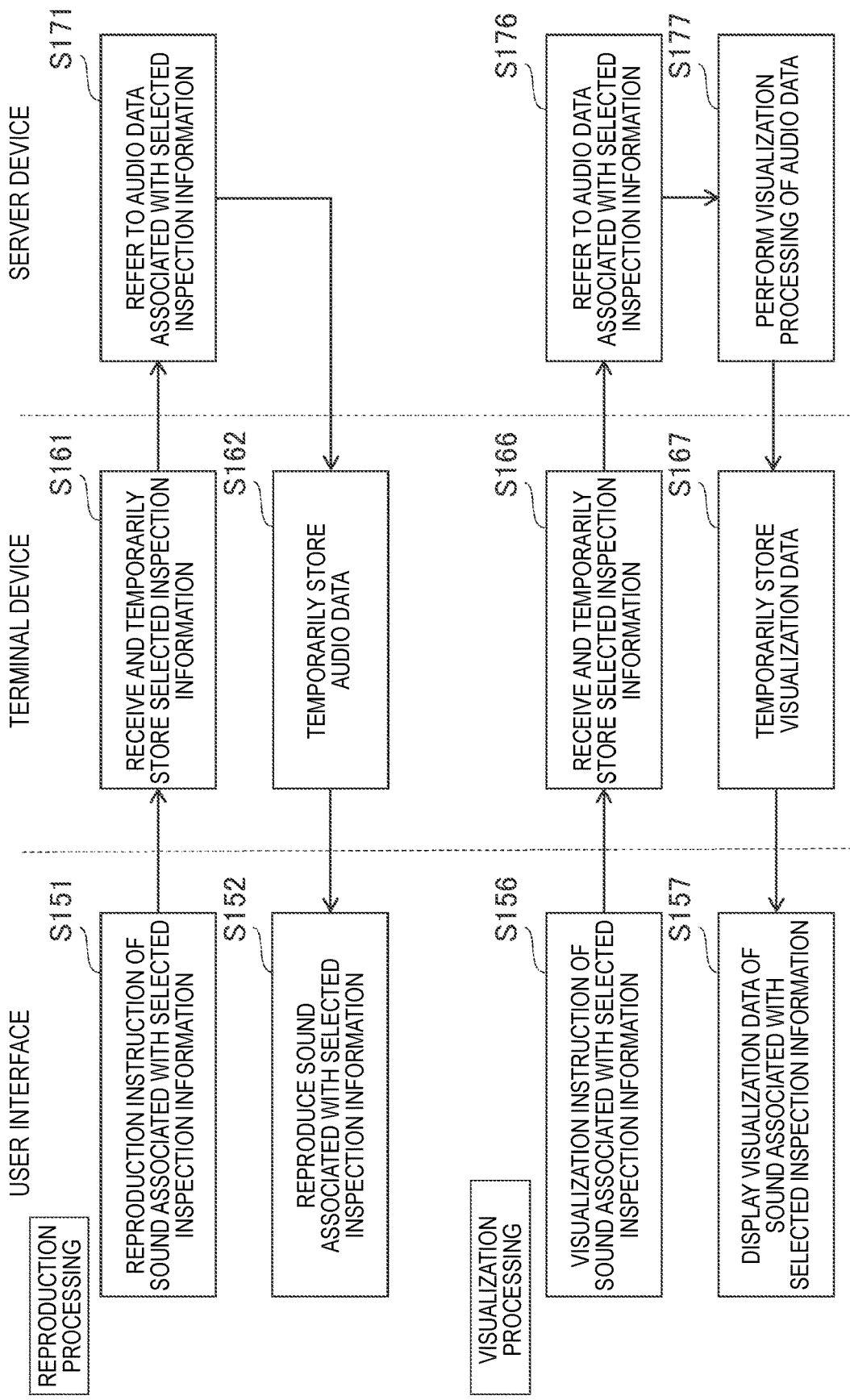
FIG. 28 is a sequence diagram showing an operation of the abnormality predicting system according to the fifth embodiment.

FIG. 28 is a sequence diagram showing an operation of the abnormality predicting system according to the fifth embodiment. FIG. 28 shows a flow of a processing performed by the monitor 62, the keyboard 63, and the speaker 64 as the user interfaces, the terminal device 20C, and the server device 40C in the abnormality predicting system according to the fifth embodiment.

When the reproduction processing of the audio data is performed, a reproduction instruction of the sound associated with the inspection information selected by the user is input based on the user operation from the keyboard 63 or the like (S151). The terminal device 20C receives and temporarily stores the selected inspection information in the user operation input unit 25C, and transmits the selected inspection information to the server device 40C through the communication unit 26 (S161). The server device 40C refers to the audio data associated with the inspection information selected from the audio data stored in the storage unit 42, and transmits the audio data to the terminal device 20C (S171). The terminal device 20C temporarily stores the audio data received from the server device 40C, performs a reproduction processing of the audio data by the output processing unit 24C, and outputs the audio data (S162). Accordingly, the sound associated with the selected inspection information is reproduced and output from the speaker 64 (S152).

When the visualization processing of the audio data is performed, a visualization instruction of the sound associated with the inspection information selected by the user is input based on the user operation from the keyboard 63 or the like (S156). The terminal device 20C receives and temporarily stores the selected inspection information in the user operation input unit 25C, and transmits the selected inspection information to the server device 40C through the communication unit 26 (S166). The server device 40C refers to the audio data associated with the inspection information selected from the audio data stored in the storage unit 42 (S176). Then, the server device 40C performs a visualization processing of the audio data by the data visualization unit 47, and transmits the visualization data to the terminal device 20C (S177). The terminal device 20C temporarily stores the visualization data received from the server device 40C, and outputs the visualization data by the output processing unit 24C (S167). Accordingly, the visualization data of the sound associated with the selected inspection information is displayed and output on the monitor 62 by a spectrogram, a time transition graph of the sound volume, or the like (S157).

In the present embodiment, by executing the processing in a distributed manner according to a system configuration of the abnormality predicting system, it is possible to efficiently reproduce or visualize and display predetermined audio data at high speed, and it is possible for the user to easily confirm the relevance between the audio data and the abnormality degree or the possibility of failure.

As mentioned above, the abnormality predicting system according to the present embodiment includes: the data input unit 11 configured to input processing target data including at least one of audio data and vibration data acquired from a target device; the storage unit 12 configured to store information related to an abnormality prediction of the processing target data; the abnormality degree calculation unit 112 configured to calculate an abnormality degree of the processing target data; the evaluation unit 13 configured to execute a processing related to the abnormality prediction including a failure occurrence prediction using a latest abnormality degree transition and a past abnormality degree transition of the processing target data; the display processing unit 14 configured to generate a display screen for displaying a processing result including a result of the abnormality degree transition and a result of the failure occurrence prediction; and the monitor 62 as a display unit configured to display the display screen. Accordingly, the user can easily check the display screen to grasp the result of the abnormality degree transition and the result of the failure occurrence prediction, and can easily perform the determination and prediction of the abnormal state. In addition, the user can confirm the trend of the abnormality degree and easily grasp the sign of the failure before the failure occurs in the target device.

In the abnormality predicting system, the evaluation unit 13 compares the latest abnormality degree transition and the past abnormality degree transition of the processing target data, predicts the possibility of failure of the target device in the near future based on the past abnormality degree transition having a high matching degree with a matching rate equal to or higher than a predetermined value, and outputs the prediction as a failure occurrence prediction result. For example, the past abnormality degree transition having a high matching degree is used as the future prediction abnormality degree transition as it is, or the future prediction abnormality degree transition is generated by performing a predetermined calculation processing by using the past abnormality degree transition having a high matching degree, or a prediction of the abnormality degree transition in the near future is performed by a processing such as prediction of an abnormality degree transition by a machine learning processing using a past abnormality degree transition having a high matching degree. Accordingly, it is possible to predict the possibility of failure in the near future by using the past abnormality degree transition having a high matching degree with respect to the current abnormality degree transition, and provide the prediction as a failure occurrence prediction result.

In the abnormality predicting system, the display processing unit 14 displays the latest abnormality degree transition as the current abnormality degree transition, and when the past abnormality degree transition having a high matching degree exists, generates a display screen that displays the future prediction abnormality degree transition using the past abnormality degree transition. Accordingly, by displaying the future prediction abnormality degree transition as the prediction result using the past abnormality degree transition having a high matching degree, the user can easily grasp the prediction result of the abnormality degree transition from the current time to the near future.

In addition, in the abnormality predicting system, when a past abnormality degree transition having a high matching degree exists, the display processing unit 14 displays a matching rate of the abnormality degree transition on the display screen. Accordingly, the user can grasp a degree of the matching degree related to the future prediction abnormality degree transition, and can use the degree of the matching degree for determining the possibility of failure.

In the abnormality predicting system, the display processing unit 14 displays a message indicating the failure occurrence prediction result on the display screen. For example, a prediction result such as the presence or absence of a possibility of occurrence of a failure and a date and time with the failure occurrence possibility is displayed. Accordingly, the user can grasp the prediction result of the possibility of failure that may occur in the near future.

In the abnormality predicting system, when the possibility of failure of the target device in the near future is equal to or higher than a predetermined value, the display processing unit 14 displays a message indicating a notification that there is a possibility of failure on the display screen. Accordingly, the user can grasp that there is a possibility of occurrence of a failure in the near future and the date and time with the failure occurrence possibility.

In the abnormality predicting system, the evaluation unit 13 calculates the abnormality degree for each abnormality cause related to the processing target data and executes a processing related to the abnormality prediction, and the display processing unit 14 displays the ratio of the abnormality degree for each abnormality cause on the display screen. Accordingly, it is possible to grasp the abnormality degree for each abnormality cause, and it is possible to take appropriate measures according to the abnormality cause.

In addition, the abnormality predicting system includes the data visualization unit 17 configured to generate the visualization data for visualizing a physical quantity of the predetermined processing target data designated based on the abnormality degree transition on the display screen, and the visualization data display unit 143 of the output processing unit 14B serving as the display processing unit displays the visualization data on the display screen. Accordingly, it is possible to easily grasp the relevance between the abnormality degree and the sound characteristic of the audio data based on the visualization information.

In addition, in the abnormality predicting system, the visualization data display unit 143 displays a spectrogram or a time transition of the sound volume related to one or a plurality of pieces of processing target data as the visualization data on the display screen. Accordingly, it is possible to easily grasp the relevance between the abnormality degree and the sound characteristic of the audio data by the spectrogram or the time transition of the sound volume.

In addition, the abnormality predicting system includes the audio reproduction unit 144 configured to reproduce predetermined processing target data designated based on the abnormality degree transition on the display screen as an audio signal. Accordingly, it is possible to easily grasp the relevance between the abnormality degree and the reproduction sound of the audio data.

In the abnormality predicting system, the evaluation unit 13 predicts the possibility of failure of the target device in the near future using one or more statistical classification techniques. Accordingly, it is possible to predict an appropriate possibility of failure according to the acquired processing target data.

In the abnormality predicting system, the abnormality degree calculation unit 112 calculates the abnormality degree of the processing target data using one or more statistical classification techniques. Accordingly, it is possible to calculate an appropriate abnormality degree according to the acquired processing target data.

In addition, the abnormality predicting system includes the data processing device 10 as an information processing device including the storage unit 12, the abnormality degree calculation unit 112, the evaluation unit 13, and the display processing unit 14. Accordingly, in the data processing device 10, it is possible to perform the calculation of the abnormality degree, the processing related to the abnormality prediction including the failure occurrence prediction, and the generation of the display screen displaying the processing result including the results of the abnormality degree transition and the failure occurrence prediction, and provide the user with the result of the abnormality degree transition, the result of the failure occurrence prediction, and the like.

In addition, the abnormality predicting system includes the terminal device 20 including the data input unit 21 and the display processing unit 24, and the server device 40 including the storage unit 42, the abnormality degree calculation unit 412, and the evaluation unit 43. Accordingly, in the terminal device 20 and the server device 40, it is possible to perform the processing in a distributed manner, the calculation of the abnormality degree, the processing related to the abnormality prediction including the failure occurrence prediction, and the generation of the display screen displaying the processing result including the results of the abnormality degree transition and the failure occurrence prediction, and provide the user with the result of the abnormality degree transition, the result of the failure occurrence prediction, and the like.

In the abnormality predicting system, the mobile communication terminal 20A serving as the terminal device includes a microphone as the sound collection unit configured to acquire processing target data of the target device, a camera as the image capturing unit configured to capture an image of the identification mark 55 corresponding to the target device, and the display 62A as the display unit configured to display a captured image of the identification mark. The display processing unit displays guide frames 621 and 622 as guide displays for defining a size of the captured image of the identification mark 55 and the identification mark image 623 as a captured image obtained by capturing the image of the identification mark 55 by the image capturing unit on the display screen of the display unit, and the data input unit inputs the processing target data of the target device when the captured image falls within a range of the guide displays. Accordingly, by setting the measurement position and the measurement distance by a captured image, acquiring the audio data, and displaying a processing result using the mobile communication terminal 20A, it is possible to easily perform grasping of the abnormality degree transition, determination of the abnormal state, prediction of the possibility of failure, and the like.

The abnormality predicting method according to the present embodiment includes: inputting processing target data including at least one of audio data and vibration data acquired from a target device; storing information related to an abnormality prediction of the processing target data; calculating an abnormality degree of the processing target data; executing a processing related to the abnormality prediction including a failure occurrence prediction using a latest abnormality degree transition and a past abnormality degree transition of the processing target data; generating a display screen for displaying a processing result including a result of the abnormality degree transition and a result of the failure occurrence prediction; and displaying the display screen on a display unit. Accordingly, the user can easily check the display screen to grasp the result of the abnormality degree transition and the result of the failure occurrence prediction, and can easily perform the determination and prediction of the abnormal state. In addition, the user can confirm the trend of the abnormality degree and easily grasp the sign of the failure before the failure occurs in the target device.

Although the embodiments are described above with reference to the drawings, it is needless to say that the present invention is not limited thereto. It will be apparent to those skilled in the art that various changes and modifications may be conceived within the scope of the claims. It is also understood that the various changes and modifications belong to the technical scope of the present invention. Constituent elements in the embodiments described above may be combined freely within a range not departing from a spirit of the invention.

The present application is based on Japanese Patent Application No. 2018-129168 filed on Jul. 6, 2018, the contents of which are incorporated herein by reference.

INDUSTRIAL APPLICABILITY

The present disclosure is useful as an abnormality predicting system and an abnormality predicting method capable of easily performing and confirming determination and prediction of an abnormal state of a target device.

REFERENCE SIGNS LIST

10: data processing device
11, 21: data input unit
12, 42: storage unit
13, 43: evaluation unit
14, 24: display processing unit
15, 25: user operation input unit
20: terminal device
20A: mobile communication terminal
26, 46: communication unit
30: cloud computer
40: server device
50: cooling fan (target device)
55: identification mark
61: microphone
62: monitor
63: keyboard
64: speaker
80: communication path
111, 211: acoustic analysis unit
112, 412: abnormality degree calculation unit
121, 421: audio data storage unit
122, 422: abnormality degree storage unit
123, 423: event tag storage unit
124, 424: evaluation result storage unit
131, 431: abnormality degree transition matching unit
132, 432: failure occurrence prediction unit
141, 241: abnormality degree transition display unit
142, 242: abnormality prediction result display unit
151, 251, 451: device event input unit
152, 252: display content instruction input unit

The invention claimed is:

1. An abnormality predicting system, comprising:
a display;
at least one processor;
a memory having instructions that, when executed by the at least one processor, cause the at least one processor to execute operations, the operations including:
storing, in a storage, abnormality prediction data, the abnormality prediction data including a first plurality of sample data points;
storing, in the storage, abnormality degree data in association with the abnormality prediction data;
inputting processing target data comprising at least one of audio data and vibration data acquired from a target device, the at least one of the audio data and the vibration data including a second plurality of sample data points;
matching the second plurality of sample data points with a first set of the first plurality of sample data points;
calculating an abnormality degree of the processing target data based on a matching rate of the second plurality of sample data points with the first set of the first plurality of sample data points;
determining an abnormality prediction of the target device based on the abnormality prediction data which is stored in the storage in association with the first set of the first plurality of sample data points, the abnormality prediction comprising a failure occurrence prediction of the target device and being used for at least one of maintenance, repair, or replacement of the target device; and
generating a display screen for displaying the abnormality prediction on the display, the display screen showing the second plurality of sample data points matched with the first set of the first plurality of sample data points,
wherein a second set of the first plurality of sample data points, which is associated with inspection dates later in time than the first set of the first plurality of sample data points, which does not match the second plurality of sample data points, and which is between the first set of the first plurality of sample data points and the failure occurrence prediction in time, is included in the abnormality prediction data and displayed on the display screen in association with the inspection dates later in time and used for the at least one of the maintenance, the repair, or the replacement of the target device.

2. The abnormality predicting system according to claim 1,
wherein the operations further include:
comparing the second plurality of sample data points and the first set of the first plurality of sample data points;
predicting a possibility of failure of the target device based on the second plurality of sample data points and the first set of the first plurality of sample data points having the matching rate equal to or higher than a predetermined value; and
outputting a result of the predicting as a failure occurrence prediction result.

3. The abnormality predicting system according to claim 1,
wherein the operations further include:
executing preprocessing for the processing target data, the preprocessing comprising at least one of a time-frequency conversion processing and a feature amount extraction processing, and
the at least one processor calculates the abnormality degree using all or a part of time-frequency conversion processed data after the time-frequency conversion processing or feature amount extraction processed data after the feature amount extraction processing.

4. The abnormality predicting system according to claim 1, wherein the at least one processor is configured to calculate abnormality degrees for respective abnormality causes related to the processing target data, and execute the processing related to the abnormality prediction, and wherein the at least one processor is configured to generate the display screen to display a ratio of the abnormality degree for each of the abnormality causes.

5. The abnormality predicting system according to claim 1, wherein the operations further include:

generating visualization data for visualizing a quantity of the processing target data based on the abnormality degree on the display screen, and the at least one processor is configured to generate the display screen to display the visualization data.

6. The abnormality predicting system according to claim 1, wherein the operations further include:

reproducing the processing target data based on the abnormality degree on the display screen as an audio signal.

7. The abnormality predicting system according to claim 1, wherein the at least one processor is configured to calculate the abnormality degree of the processing target data using one or more statistical classification techniques.

8. The abnormality predicting system according to claim 1, further comprising:

a computer that includes an audio interface, the processing target data being inputted via the audio interface.

9. The abnormality predicting system according to claim 1, further comprising:

a terminal device comprising a first processor of the at least one processor, the first processor being configured to execute the inputting and the generating; and a server device comprising a second processor of the at least one processor, the second processor being configured to execute the storing, the calculating, and the determining.

10. The abnormality predicting system according to claim 1, wherein the operations further include:

in a case where the second plurality of sample data points does not match any set of the first plurality of sample data points, the display screen is generated to show that the abnormality prediction includes an absence of the failure occurrence prediction.

11. The abnormality predicting system according to claim 1, wherein the operations further include:

calculating, as the matching rate and for corresponding ones of the second plurality of sample data points and the first set of the first plurality of sample data points, a ratio of a number of points having a difference less than a predetermined value.

12. The abnormality predicting system according to claim 1, wherein the first plurality of sample data points and the second plurality of sample data points are time-series data points.

13. The abnormality predicting system according to claim 2, wherein the at least one processor is configured to generate the display screen to display the first plurality of sample data points as a current abnormality degree, and if the first set of the first plurality of sample data points having a predetermined matching degree exists, display a future prediction abnormality degree using a past abnormality degree.

14. The abnormality predicting system according to claim 2, wherein the at least one processor is configured to predict the possibility of failure of the target device using one or more statistical classification techniques.

15. The abnormality predicting system according to claim 5, wherein the at least one processor is configured to generate the display screen to display a spectrogram or a time transition of a sound volume related to one or a plurality of pieces of the processing target data as the visualization data.

16. The abnormality predicting system according to claim 9, wherein the terminal device comprises:

a microphone configured to acquire the processing target data of the target device;

a camera configured to capture an image of an identification mark corresponding to the target device; and the display configured to display a captured image of the identification mark, wherein the first processor is configured to display a guide display for defining a size of the captured image of the identification mark and the captured image obtained by capturing the image of the identification mark by the camera on the display screen of the display, and wherein the first processor is configured to input the processing target data of the target device in response to the captured image being within a range of the guide display.

17. The abnormality predicting system according to claim 13, wherein the at least one processor is configured to generate the display screen to display the matching rate if the predetermined matching degree exists.

18. The abnormality predicting system according to claim 13, wherein the at least one processor is configured to generate the display screen to display a message indicating the failure occurrence prediction result.

19. The abnormality predicting system according to claim 18, wherein the at least one processor is configured to generate the display screen to display a message indicating a notification that there is the possibility of failure if the possibility of failure of the target device is equal to or higher than the predetermined value.

20. An abnormality predicting method comprising:

storing abnormality prediction data, the abnormality prediction data including a first plurality of sample data points;

storing abnormality degree data in association with the abnormality prediction data;

inputting processing target data comprising at least one of audio data and vibration data acquired from a target device, the at least one of the audio data and the vibration data including a second plurality of sample data points;

matching the second plurality of sample data points with a first set of the first plurality of sample data points;

calculating an abnormality degree of the processing target data based on a matching rate of the second plurality of sample data points with the first set of the first plurality of sample data points;

determining an abnormality prediction of the target device based on the abnormality prediction data which is stored in the storage in association with the first set of the first plurality of sample data points, the abnormality prediction comprising a failure occurrence prediction;

generating a display screen for displaying the abnormality prediction on a display, the display screen showing the second plurality of sample data points matched with the first set of the first plurality of sample data points of the target device and being used for at least one of maintenance, repair, or replacement of the target device; and displaying the display screen on the display, wherein a second set of the first plurality of sample data points, which is associated with inspection dates later in time than the first set of the first plurality of sample data points, which does not match the second plurality of sample data points, and which is between the first set of the first plurality of sample data points and the failure occurrence prediction in time, is included in the abnormality prediction data and displayed on the display screen in association with the inspection dates later in time and used for the at least one of the maintenance, the repair, or the replacement of the target device.

* * * * *